United States Patent
Kafle et al.

(10) Patent No.: US 9,197,680 B2
(45) Date of Patent: Nov. 24, 2015

(54) ESTABLISHING AND CONTROLLING AUDIO AND VOICE BACK CHANNELS OF A WI-FI DISPLAY CONNECTION

(71) Applicant: QUALCOMM Incorporated, San Diego, CA (US)

(72) Inventors: Padam Lal Kafle, San Diego, CA (US); Vijay Naicker Subramaniam, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/139,816

(22) Filed: Dec. 23, 2013

(65) Prior Publication Data

US 2014/0347433 A1 Nov. 27, 2014

Related U.S. Application Data

(60) Provisional application No. 61/826,993, filed on May 23, 2013.

(51) Int. Cl.
*H04L 29/06* (2006.01)
*H04N 7/15* (2006.01)
(Continued)

(52) U.S. Cl.
CPC ........ *H04L 65/1069* (2013.01); *H04L 65/4015* (2013.01); *H04L 65/608* (2013.01);
(Continued)

(58) Field of Classification Search
CPC ............ H04L 65/1069; H04L 65/4015; H04L 65/608; H04N 7/15
USPC ........ 345/2.3, 157, 428, 156, 163; 348/14.02, 348/181; 370/259, 468, 474, 310, 329, 335; 375/240.01, 240.26; 455/3.06, 41.2; 701/32.7; 709/201, 204, 217; 710/10, 710/11, 20, 56; 725/74, 81, 109, 118; 700/94
See application file for complete search history.

(56) References Cited

U.S. PATENT DOCUMENTS 8,677,029 B2 * 3/2014 Raveendran .......... H04W 28/18
710/10
8,730,328 B2 * 5/2014 Luo ................... H04N 21/43615
348/14.13

(Continued)

FOREIGN PATENT DOCUMENTS

WO  WO-2012100214 A1  7/2012
WO  WO-2013052879 A1  4/2013

OTHER PUBLICATIONS

ISA/EPO, Partial International Search Report of the International Searching Authority, Int'l. App. No. PCT/US2014/037828, Jan. 8, 2015, European Patent Office, Rijswijk, NL, 5 pgs.

(Continued)

*Primary Examiner* — Gerald Gauthier
(74) *Attorney, Agent, or Firm* — Holland & Hart LLP

(57) ABSTRACT

Methods, systems, and devices are described for using a back channel for communicating in a Wi-Fi peer-to-peer remote display connection. A Wi-Fi peer-to-peer remote display connection may be established with a source device. Communications may be transmitted from a sink device to the source device using a back channel of the Wi-Fi peer-to-peer remote display connection. The sink device may connect with a plurality of source devices. A plurality of input streams may be multiplexed into a single output stream. The single output stream may be distributed to the plurality of source devices using back channels of the Wi-Fi peer-to-peer remote display connection. In addition, a source device may connect, via a wired connection, with a sink device. Wi-Fi connection parameters may be exchanged with the wired connection. A Wi-Fi peer-to-peer connection may be established based at least in part on the Wi-Fi connection parameters.

87 Claims, 18 Drawing Sheets

(51) Int. Cl.
*H04L 29/08* (2006.01)
*H04N 21/422* (2011.01)
*H04N 21/4363* (2011.01)
*H04W 76/02* (2009.01)

(52) U.S. Cl.
CPC .......... *H04L67/104* (2013.01); *H04L 67/1074* (2013.01); *H04N 7/15* (2013.01); *H04N 21/42207* (2013.01); *H04N 21/43637* (2013.01); *H04W 76/023* (2013.01)

(56) References Cited

U.S. PATENT DOCUMENTS

| | | | | |
|---|---|---|---|---|
| 8,768,252 | B2* | 7/2014 | Watson | H04R 5/02 381/300 |
| 8,792,429 | B2* | 7/2014 | Hassan | H04L 12/2818 370/329 |
| 8,887,222 | B2* | 11/2014 | Huang | H04W 4/06 725/109 |
| 8,914,187 | B2* | 12/2014 | Wang et al. | 701/32.7 |
| 8,964,783 | B2* | 2/2015 | Huang | H04L 65/608 370/230 |
| 8,966,131 | B2* | 2/2015 | Huang | H04L 65/4092 345/156 |
| 8,996,762 | B2* | 3/2015 | Wang | H04N 21/4307 709/201 |
| 9,014,277 | B2* | 4/2015 | Rabii | 375/240.26 |
| 9,065,876 | B2* | 6/2015 | Huang | H04L 65/4092 1/1 |
| 9,106,651 | B2* | 8/2015 | Froelicher | H04L 67/10 1/1 |
| 2009/0310570 | A1* | 12/2009 | Smith | H04W 76/023 370/335 |
| 2011/0107388 | A1* | 5/2011 | Lee et al. | 725/118 |
| 2012/0047289 | A1 | 2/2012 | Krzystofczyk et al. | |
| 2013/0003623 | A1* | 1/2013 | Raveendran | H04L 65/608 370/310 |
| 2013/0009873 | A1* | 1/2013 | Huang | H04L 65/608 345/163 |
| 2013/0033496 | A1* | 2/2013 | Raveendran et al. | 345/428 |
| 2013/0047189 | A1* | 2/2013 | Raveendran | H04N 21/23 725/81 |
| 2013/0089006 | A1* | 4/2013 | Huang | H04B 7/26 370/259 |
| 2013/0128948 | A1* | 5/2013 | Rabii et al. | 375/240.01 |
| 2013/0162523 | A1* | 6/2013 | Tomaszewski | G06F 3/1454 345/156 |
| 2013/0195119 | A1* | 8/2013 | Huang | H04L 65/4092 370/468 |
| 2013/0238702 | A1* | 9/2013 | Sheth | H04L 67/38 709/204 |
| 2013/0246565 | A1* | 9/2013 | Froelicher et al. | 709/217 |
| 2013/0246665 | A1* | 9/2013 | Lee et al. | 710/11 |
| 2013/0304794 | A1* | 11/2013 | Verma | G06F 3/038 709/201 |
| 2014/0009394 | A1* | 1/2014 | Lee et al. | 345/157 |
| 2014/0120829 | A1* | 5/2014 | Bhamidipati et al. | 455/3.06 |
| 2014/0172141 | A1* | 6/2014 | Mangold | H04B 11/00 700/94 |
| 2014/0210693 | A1* | 7/2014 | Bhamidipati | H04L 65/4092 345/2.3 |
| 2014/0215532 | A1* | 7/2014 | Schmidt et al. | 725/74 |
| 2014/0331263 | A1* | 11/2014 | Smadi et al. | 725/81 |
| 2014/0347433 | A1* | 11/2014 | Kafle | H04L 65/1069 348/14.02 |
| 2015/0172757 | A1* | 6/2015 | Kafle | H04L 67/1044 725/81 |

OTHER PUBLICATIONS

ISA/EPO, International Search Report and Written Opinion of the International Searching Authority, Int'l. App. No. PCT/US2014/037828, Mar. 18, 2015, European Patent Office, Rijswijk, NL, 19 pgs.

* cited by examiner

ESTABLISHING AND CONTROLLING AUDIO AND VOICE BACK CHANNELS OF A WI-FI DISPLAY CONNECTION

CROSS REFERENCES

The present application for patent claims priority benefit to U.S. Provisional Patent Application No. 61/826,993, entitled "Establishing and Controlling Audio and Voice Back Channels of a Wi-Fi Display Connection" by Kafle et al., filed May 23, 2013, and assigned to the assignee hereof.

BACKGROUND

The following relates generally to wireless communication, and more specifically to Wi-Fi peer-to-peer remote display networks. Wireless communications systems are widely deployed to provide various types of communication content such as voice, video, packet data, messaging, broadcast, and so on. These systems may be wireless local area network (WLAN), also known as Wi-Fi systems which utilize carrier sense multiple access with collision avoidance (CSMA/CA) mechanisms to access a wireless medium. These systems may also be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a peer-to-peer network allows wireless devices to directly communicate with each other. Devices within range of each other may discover and communicate directly without involving central access points. Wi-Fi peer-to-peer remote display connections allow portable devices or computers to transmit video and audio to a compatible display wirelessly. The device that transmits the video and audio may be referred to as a source device. The compatible display may be referred to as a sink device. The communications from the source device to the sink device may be carried on a forward channel. Back channels, however, are not available to carry audio, voice, video, etc. from the sink device to the source device in a Wi-Fi remote display connection.

SUMMARY

The described features generally relate to one or more improved systems, methods, and/or apparatuses for using a back channel to communicate in a Wi-Fi peer-to-peer remote display connection. In one example, a source device and a sink device may be connected via a Wi-Fi peer-to-peer remote display connection. The source device may transmit data to be displayed on the sink device via a forward channel. The sink device may transmit communications (e.g., audio, voice, video, etc.) to the source device using a back channel of the Wi-Fi peer-to-peer remote display connection.

The sink device may be connected with a plurality of source devices via Wi-Fi peer-to-peer remote display connections. The sink device may multiplex a plurality of input streams to produce a single output stream. The single output stream may be distributed to the plurality of source devices using back channels of the Wi-Fi peer-to-peer remote display connections. In one configuration, the single output stream may be simultaneously transmitted to different source devices using the back channels. The output stream may include a plurality of audio packets and/or a plurality of voice packets. The voice packets may be transmitted to a single source device using a unicast address of the source device. The audio packets, however, may be simultaneously multicast or broadcast to additional source devices connected to the sink device.

In one embodiment, a wired connection between two devices may be used to establish a wireless link for the Wi-Fi peer-to-peer connection. In one example, a server device (i.e., a source device) may connect with a client device (i.e., a sink device) via a wired connection, such as a Universal Serial Bus (USB) connection in MirrorLink specification for Car Connectivity applications. The server device may transmit Wi-Fi connection parameters for the server device to the client device. These parameters may be transmitted to the client device via the wired connection. The server device may receive Wi-Fi connection parameters for the client device via the wired connection. The Wi-Fi connection parameters for the server device and the client device may be used to establish the Wi-Fi peer-to-peer connection between the server device and the client device.

A method for using a back channel for communicating in a Wi-Fi peer-to-peer remote display connection is described. A connection may be established with a source device via a Wi-Fi peer-to-peer remote display connection. Communications from a sink device may be transmitted to the source device using a back channel of the Wi-Fi peer-to-peer remote display connection.

In one embodiment, transmitting communications may include streaming audio from the sink device to the source device via the back channel. The streaming of audio may be switched to a transmission of voice communications via the back channel.

In one configuration, transmitting communications may include transmitting voice communications to the source device via the back channel. The transmission of the voice communications may be switched to a streaming of audio via the back channel. The voice communications may be a part of a bi-directional voice call.

In one example, a message may be received from the source device requesting an audio type, an audio codec and its associated parameters to use to stream audio to the source device via the back channel. A message may be received from the source device to de-activate the transmission of communications via the back channel. In one configuration, the transmission of the communications may be de-activated based at least in part on an initialization of an application at the source device. The transmission of the communications may be de-activated based at least in part on user intervention at the source device. A message may be received from the source device to re-activate the transmission of communications via the back channel.

In one embodiment, one or more settings of a forward channel may be identified that are used to transmit information from the source device A transport port and audio codecs may be identified that are used to transmit communications via the back channel. The identification of the transport port and audio codecs may be based at least in part on the identified settings of the forward channel.

Real-Time Transport Protocol (RTP) port profile information may be received from the source device. The profile information may identify whether a User Datagram Protocol (UDP) port or a Transmission Control Protocol (TCP) port has been created for the communication transmissions via the back channel. A message requesting an audio type and an audio codec to use to stream audio to the source device via the back channel may be received from the source device. The message may be sent within a Real Time Streaming Protocol (RTSP) data structure of a User Input Back Channel (UIBC) capability negotiation message.

The audio may be streamed via the back channel as a MPEG2-Transport Stream (TS). A query may be received from the source device as to whether communication transmissions via the back channel are supported. A response may be transmitted to a query. The response may indicate that communication transmissions via the back channel are supported. A list of one or more supported audio types and audio codecs may also be transmitted. An audio type and audio codec parameters requested by the source device to be used while transmitting via the back channel may be received from the source device.

An apparatus configured to use a back channel for communications in a Wi-Fi peer-to-peer remote display connection is also described. The apparatus may include means for connecting with a source device via a Wi-Fi peer-to-peer remote display connection, and means for transmitting communications from a sink device to the source device using a back channel of the Wi-Fi peer-to-peer remote display connection.

A sink device configured to use a back channel for communications in a Wi-Fi peer-to-peer remote display connection is also described. The sink device may include a processor and memory in electronic communication with the processor. Instructions may be stored in the memory. The instructions may be executable by the processor to connect with a source device via a Wi-Fi peer-to-peer remote display connection, and transmit communications from the sink device to the source device using a back channel of the Wi-Fi peer-to-peer remote display connection.

A computer program product for using a back channel for communicating in a Wi-Fi peer-to-peer remote display connection is also described. The computer program product may include a non-transitory computer-readable medium. The non-transitory computer-readable medium may store instructions executable by a processor to connect with a source device via a Wi-Fi peer-to-peer remote display connection, and transmit communications from a sink device to the source device using a back channel of the Wi-Fi peer-to-peer remote display connection.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Communications between a source device and a sink device connected via a Wi-Fi peer-to-peer remote display connection may be transmitted via a forward channel and a back channel. Wi-Fi remote display includes, but is not limited to the Wi-Fi Display specification, also known as Miracast®, Discovery and Launch (DIAL), Digital Living Network Alliance® (DLNA), Airplay, WirelessHD, Wireless Home Digital Interface (WHDI), Wi-Di, and Ultra-wideband (UWB) connections. It may allow a portable device or computer to transmit video and audio to a compatible display wirelessly. It may enable delivery of compressed standard or high-definition video over a peer-to-peer wireless link. It also may allow users to echo the display from one device onto the display of another device by video and/or audio content streaming in the forward channel.

In one example, the forward channel may be used for communications from the source device to the sink device while audio and video communications may also be required to be transmitted from the sink device to the source device via a back channel of the Wi-Fi peer-to-peer remote display connection. The sink device may multiplex various input streams and simultaneously transmit the output stream to multiple source devices via back channels. The output stream may include packets of different content, such as audio, audio/voice, voice, video, etc. As a result, different source devices connected to the sink device via a Wi-Fi remote display connection may simultaneously receive different audio content from the sink device. For example, voice communications may be transmitted to a first source device via a back channel while audio may be simultaneously streamed to a second source device via the back channel.

The Wi-Fi remote display connection may be established by utilizing the Wi-Fi connection parameters exchanged via an existing wired connection between the source and sink devices. The wired connection may be a MirrorLink for Car Connectivity connection. Mirrorlink is a device interoperability standard that allows integration between a device (e.g., smartphone) and a vehicle's infotainment system. The wired connection may be used to transmit various parameters between the source and sink devices to establish the Wi-Fi remote display connection.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
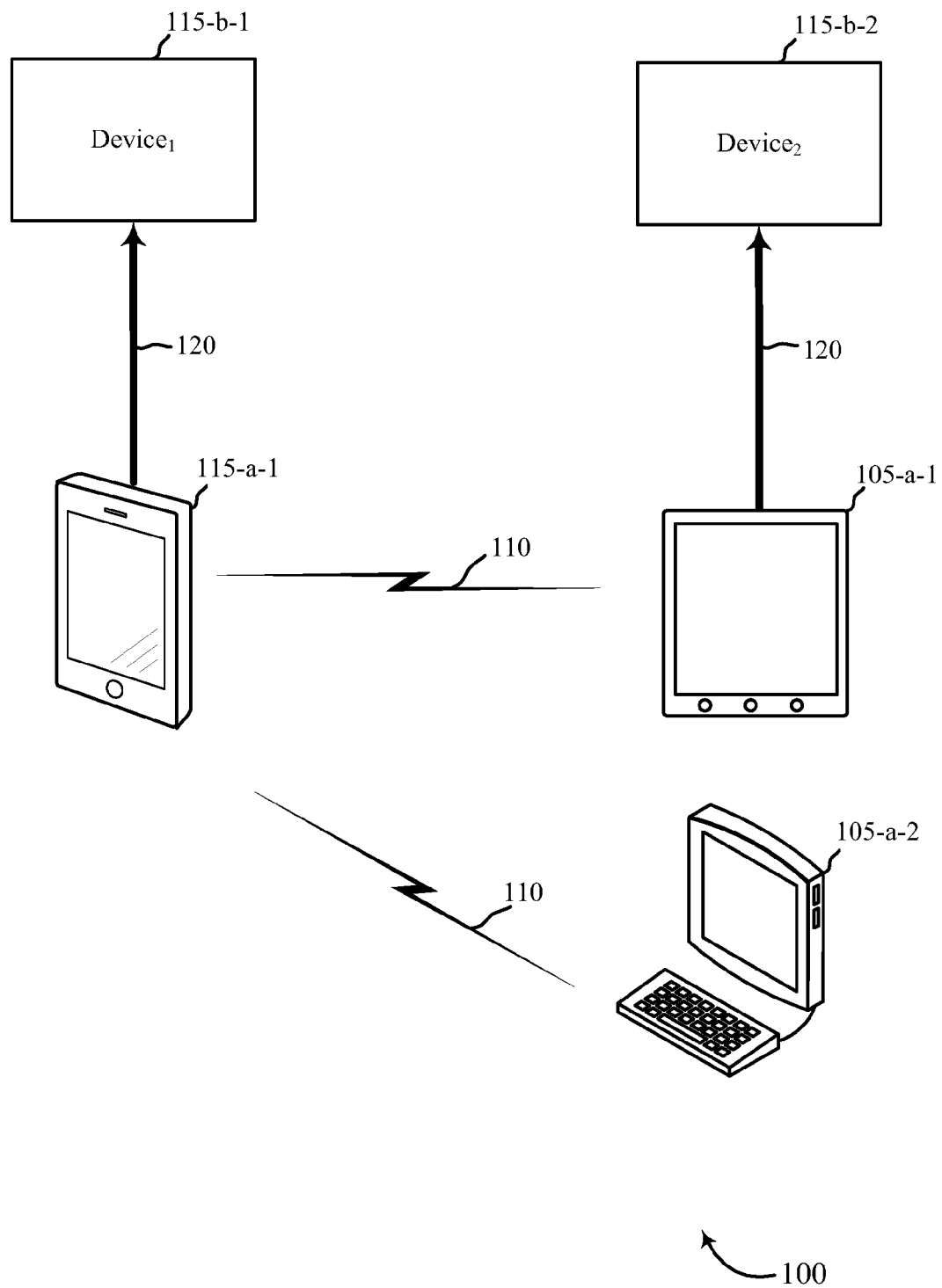
FIG. 1 shows a block diagram of a wireless communications system.

Referring now to FIG. 1, a system 100 includes various source devices 115 and various sink devices 105. Each of these components may be in communication with each other, directly or indirectly. Examples of the source devices 115 may include, but are not limited to, smartphones, cell phones, wireless headphones, tablets, personal digital assistants (PDAs), laptops, or any other device capable of communicating with a sink device via a Wi-Fi connection. Examples of the sink devices 105 may include, but are not limited to, in-vehicle infotainment devices, TVs, computers, laptops, projectors, cameras, smartphones, or any other device capable of displaying content received from a source device and communicating with a source device via a Wi-Fi connection.

In one embodiment, a first source device 115-a-1 may be connected to one or more sink devices, such as a first sink device 105-a-1 and a second sink device 105-a-2. The first source device 115-a-1 and the one or more sink devices 105 may be connected via a Wi-Fi peer-to-peer remote display connection. The Wi-Fi remote display connection may allow the source device 115-a-1 to transmit data to the one or more sink devices 105 via a link 110. The link 110 may include a forward channel that may be used for transmissions of data from the source device 115-a-1 to a sink device 105. The data transmitted from the source device 115-a-1 may be displayed by the sink device 105. In addition to video, the source device 115-a-1 may also transmit audio via the forward channel to the sink device 105. The sink device 105 may process the received video and/or audio to render the content via a display and/or speakers.

In one configuration, the connection between the source device 115-a-1 and a sink device 105 may also allow users to launch applications stored on the source device 115-a-1 via the sink device 105. For example, the sink device 105 may include various input controls (e.g., mouse, keyboard, knobs, keys, user interface buttons). These controls may be used at the sink device 105 to initialize and interact with applications stored on the source device 115-a-1.

The link 110 between the source device 115-a-1 and a sink device 105 may be bi-directional. The sink device 105 may transmit audio, voice, video, etc. to a source device via a back channel. As a result, audio and/or video may be transmitted from a sink device 105 to a source device 115 that is connected via a Wi-Fi peer-to-peer remote display connection. The Wi-Fi remote display connection may utilize a Wi-Fi Peer-to-Peer link between two Wi-Fi peer-to-peer devices. This may also be referred to as a Wi-Fi Direct connection. In another example, the Wi-Fi remote display connection may be established by using the Wi-Fi Tunneled Direct Link Setup (TDLS) link. The Wi-Fi devices in these examples may use the WLAN radio and baseband including physical and MAC layers from IEEE 802.11, and its various versions including, but not limited to, 802-11b, 802.11g, 802.11a, 802.11n, 802.11ac, 802.11ad, 802.11ah, etc. Examples of audio transmitted via the back channel to the source device 115-a-1 may include voice while the source device 115-a-1 is engaged in a phone call. The sink device 105 may include a microphone to capture voice communications from a user of the source device 115-a-1. The voice communications captured by the microphone may be processed and transmitted to the source device 115-a-1 via the back channel. The source device 115-a-1 may then process and transmit the voice communications via an antenna to another device engaged in the phone call.

While bi-directional communications may exist between the first source device 115-a-1 and the first sink device 105-a-1 and/or the second sink device 105-a-2, the sink device may communicate with additional source devices via unidirectional communications. In one embodiment, the first sink device 105-a-1 may be connected with a second source device 115-b-2 via a Wi-Fi peer-to-peer remote display connection. The first sink device 105-a-1 may be connected simultaneously or at a different time than the connection between the first sink device 105-a-1 and the first source device 115-a-1.

In one configuration, the first sink device 105-a-1 may transmit audio and/or video communications to one or more additional source devices 115-b-2 via a back channel 120. The sink device 105-a-1 may transmit these communications via the back channel 120 even though a second source device (device$_2$) 115-b-2 does not transmit communications on a forward channel to the sink device 105-a-1. The sink device 105-a-1 may simultaneously transmit audio and/or video to the first source device 115-a-1 and the second source device 115-b-2 using back channels. Alternatively, the sink device 105-a-1 may transmit communications at different times to the source devices using back channels.

In one embodiment, the first source device 115-a-1 may transmit communications to another source device (device$_1$) 115-b-1. In this scenario, the first source device 115-a-1 may also be referred to as a sink device. The first source device 115-a-1 may retransmit communications received from the first sink device 105-a-1. The retransmission of the communications to the additional source device 115-b-1 may occur using a back channel between the devices 115-a-1 and 115-b-1. In one configuration, the devices 115-a-1 and 115-b-1 may be connected via a Wi-Fi peer-to-peer remote display connection.

Figure 2:
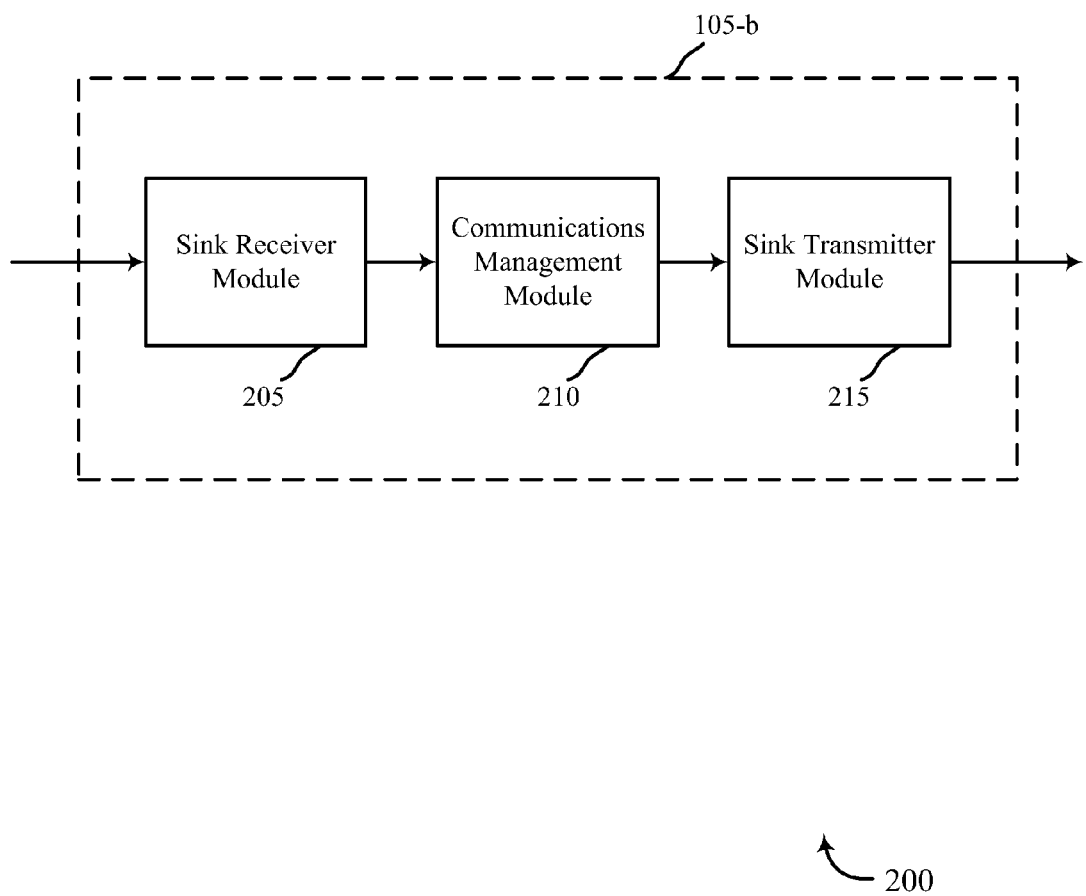
FIG. 2 shows a sink device in accordance with various embodiments.

Referring now to FIG. 2, a block diagram 200 illustrates a sink device 105-b in accordance with various embodiments. The sink device 105-b may be an example of one or more aspects of one of the sink devices 105 described with reference to FIG. 1. The device 105-b may also be a processor. The device 105-b may include a sink receiver module 205, a communications management module 210, and a sink transmitter module 215. Each of these components may be in communication with each other.

The components of the device 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The sink receiver module 205 may receive communications from one or more source devices, such as one or more of the source devices 115 described with reference to FIG. 1. The sink receiver module 205 may receive these communications via a forward channel of a Wi-Fi peer-to-peer remote display connection that is established between the sink device 105-b and the one or more source devices 115. The communications management module 210 may manage communications received by and transmitted from the sink device 105-b. For example, the communications management module 210 may identify audio and/or video to transmit to one or more source devices 115. The sink transmitter module 215 may transmit the identified communications from the sink device via a back channel of the Wi-Fi remote display connection. Further details regarding the communications management module 210 will be described below.

Figure 3:
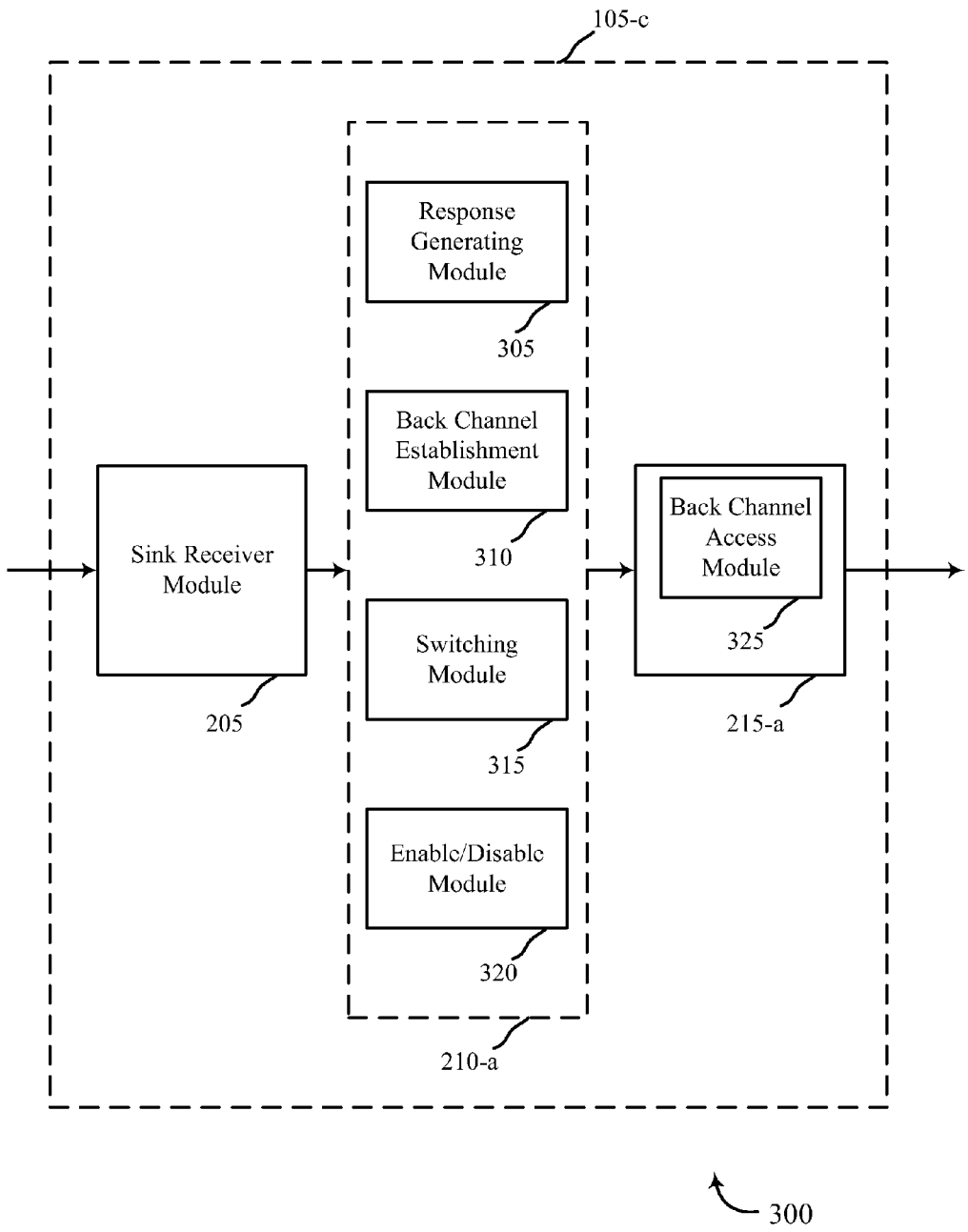
FIG. 3 is a block diagram illustrating another embodiment of the sink device.

FIG. 3 is a block diagram 300 illustrating a sink device 105-c in accordance with various embodiments. The sink device 105-c may be an example of one or more aspects of one of the sink devices 105 described with reference to FIGS. 1 and/or 2. The device 105-c may also be a processor. The device 105-c may include a sink receiver module 205, a communications management module 210-a, and a sink transmitter module 215-a. Each of these components may be in communication with each other.

The components of the device 105-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The sink receiver module 205 may be configured as previously described with reference to FIG. 2. The communications management module 210-a may include a response generating module 305, a back channel establishment module 310, a switching module 315, and an enable/disable module 320.

Before or after a Wi-Fi peer-to-peer remote display connection has been established between the sink device 105-c and a source device 115, the devices may engage in a capability negotiation procedure. In one example, the sink device 105-c may signal the source device 115 to initiate the procedure. The sink transmitter module 215-a may transmit a signal indicating whether a back channel is needed to transmit input captured at a microphone or whether the back channel is needed to transmit stored media audio (e.g., audio/video streaming).

As part of the capability negotiation procedure, the source device 115 may query the sink device 105-c for various information regarding the capabilities of the sink device 105-c to establish and communicate audio, voice, video, etc. over a back channel of the Wi-Fi remote display connection. The source device 115 may query the sink device 105-c by sending Real Time Streaming Protocol (RTSP) request messages. In one embodiment, a Wi-Fi peer-to-peer remote display connection may support User Input Back Channel (UIBC) transmissions. The UIBC may be used to transmit user inputs from the sink device 105-c to the source device 115. The user inputs may be received from knobs, buttons, keys, a mouse device, a touch screen, etc. These user inputs may be transmitted to the source device 115 in a back channel. In one configuration, the use of the current UIBC procedure may be extended to enable a back channel for audio, voice, video, etc. to be established between the sink device 105-c and a source device 115.

In one configuration, during the capability negotiation procedure, the source device 115 queries the sink device 105-c for UIBC capabilities to check if the sink device 105-c supports this feature. The response generating module 305 may generate a response to these queries that may include a list of audio types and audio codecs (with their associated parameters) that the sink device 105-c is capable of supporting in back channel transmissions. The response may further include Real-time Transport Protocol (RTP) port profile information for audio streaming in the back channel. In addition, the response may include UIBC specific parameters, and optionally may include vendor specific capability parameters of the sink device 105-c for setting up a back channel for audio, voice, etc. Once the capability negotiation procedure has concluded, the back channel establishment module 310 may establish the back channel to transmit audio, voice, video, etc.

In one example, the communications management module 210-a may identify the settings of the forward channel used to transmit communications from the source device 115. The module 210-a may further identify a transport port and audio codecs used to transmit communications via the back channel. The identified transport port and audio codecs used to transmit audio on the back channel may match the settings used to transmit information on the forward channel.

During a Wi-Fi remote display session in which the sink device 105-c and a source device 115 are communicating via forward and back channels, the switching module 315 may generate a message to change the audio type and the audio codec (and the associated parameters) to another audio type and/or another audio codec. For example, the sink device 105-c may be streaming audio via the back channel to a source device 115. The switching module 315 may generate a message indicating that the audio streaming is to be changed to a transmission of voice, such as for a bi-directional voice call. The transmission of voice may also be related to a transmission of voice commands captured at a microphone of the sink device 105-c. The voice commands may be provided by a user desiring to interact with an application on the source device 115. The voice commands may be transmitted via the back channel to the source device 115. The source device 115 may receive and process the voice commands.

In one configuration, the source device 115 may desire to de-activate the communications being transmitted on the back channel based on a voice/audio application, or due to user intervention at the source device 115. The sink device 105-c may receive a request to de-activate the transmissions, and the enable/disable module 320 may de-activate the transmissions. For example, the sink device 105-c may be streaming audio to the source device 115 via the back channel. An application on the source device 115 may be launched by a user launching the application directly at the source device 115 or the application may be launched by the user interacting with various input controls at the sink device 105-c. Upon launching the application, the enable/disable module 320 may suspend or de-activate the audio streaming on the back channel. When the application is closed, or upon receiving a user command, the enable/disable module 320 may resume the audio streaming to the source device 115 via the back channel.

In one embodiment, the sink transmitter module 215-a may include a back channel access module 325. The module 325 may access the established audio/voice back channel when the transmitter module 215-a is scheduled to transmit audio and/or voice to a source device 115. The transmissions by the sink transmitter module 215-a via the back channel may be unicast, multicast, and/or broadcast.

Figure 4:
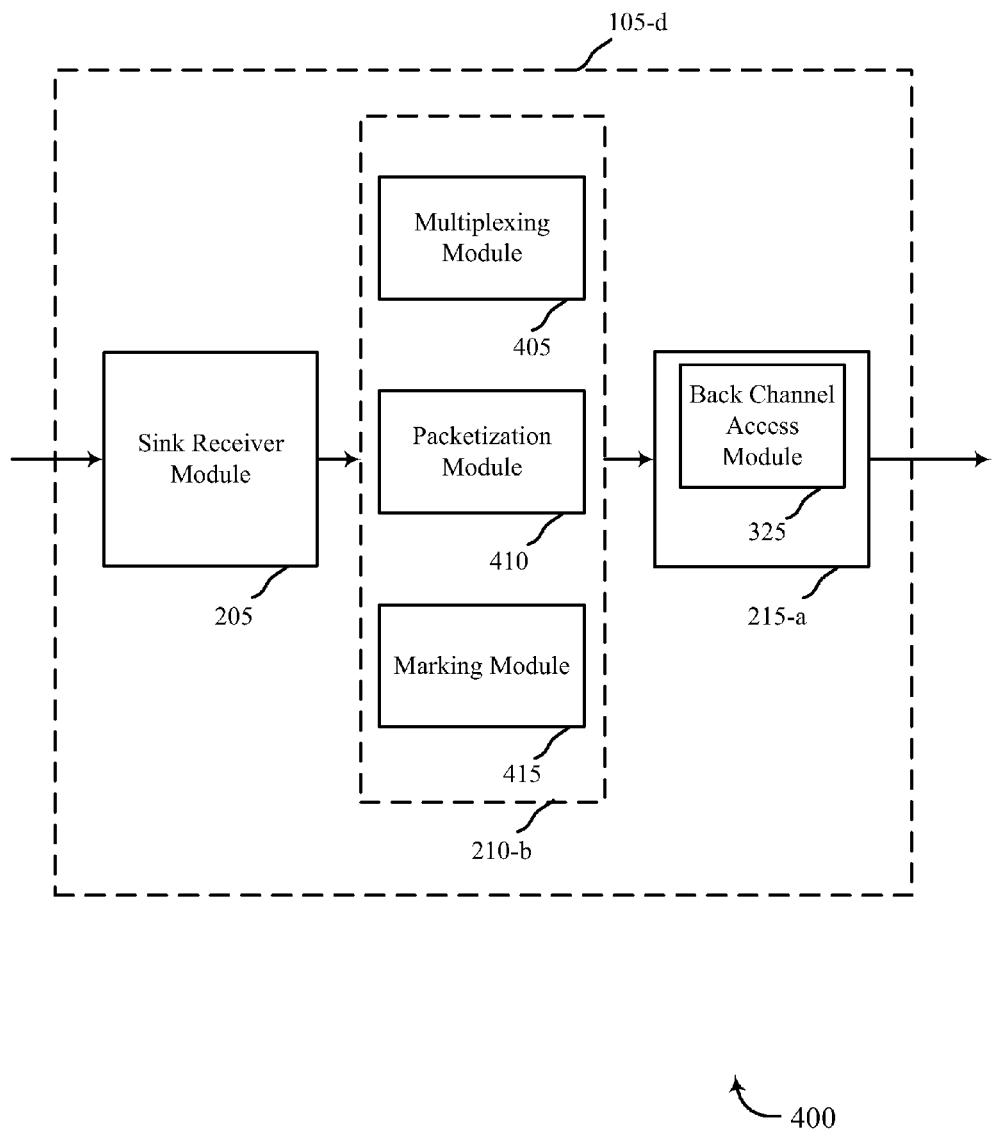
FIG. 4 illustrates another embodiment of the sink device in accordance with various embodiments.

FIG. 4 is a block diagram 400 illustrating a sink device 105-d in accordance with various embodiments. The sink device 105-d may be an example of one or more aspects of one of the sink devices 105 described with reference to FIGS. 1, 2, and/or 3. The device 105-d may also be a processor. The device 105-d may include a sink receiver module 205, a communications management module 210-b, and a sink transmitter module 215-a. Each of these components may be in communication with each other.

The components of the device 105-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The sink receiver module 205 may be configured as previously described with reference to FIG. 2. The communications management module 210-b may include a multiplexing module 405, a packetization module 410, and a marking module 415.

In one example, voice input from users received at the microphone of the sink device 105-d may be sent to a main source device 115, such as a smartphone. The sink device 105-d, however, may also have Wi-Fi peer-to-peer remote display connections with additional source devices, such as a smart phone, tablet, or a seat mounted display with accompanying speakers or wireless headphones (in a vehicle, for example), etc. In one implementation, the sink device 105-d may function as a concurrent sink and source device, communicating with a Wi-Fi display remote session established to a main source device 115, and simultaneously establishing other W-Fi display remote sessions to additional devices. Media audio stored at an audio server within the sink device 105-d may be simultaneously transmitted to these additional devices while the voice input is transmitted to the first source device 115.

The multiplexing module 405 may multiplex the audio and/or voice input streams into a single MPEG2 transport stream (TS) that includes the audio/voice payload. The MPEG2-TS may also include program clock reference (PCR) information when the sink device 105-d supports an audio back channel. In one configuration, a program map table may include information regarding the multiple input streams. As a result, the program map table may be updated when the input streams to be multiplexed by the module 405 change.

The packetization module 410 may packetize the output streams generated by the sink device 105-d. In one configuration, an output stream may include a packet that includes voice communications directed to the main source device 115. The sink transmitter module 215-a may transmit the packet with voice communications via the back channel using a unicast address of the desired source device 115. The back channel access module 325 may access the back channel for transmissions from the sink device 105-d. The output stream may further include a second packet that includes an audio streaming content. The second packet may be intended for one or more additional source devices. The sink transmitter module 215-a may multicast/broadcast this second packet to the additional source devices.

In one configuration, the marking module 415 may mark each of a plurality of input audio or voice stream packets of a single output stream. The mark may identify a program type of each input stream. A marked packet may include audio, voice, video, or a mixture of audio, voice, and/or video. Each source device that receives the stream may identify which packets it should process based at least on the mark of the packet.

Figure 5:
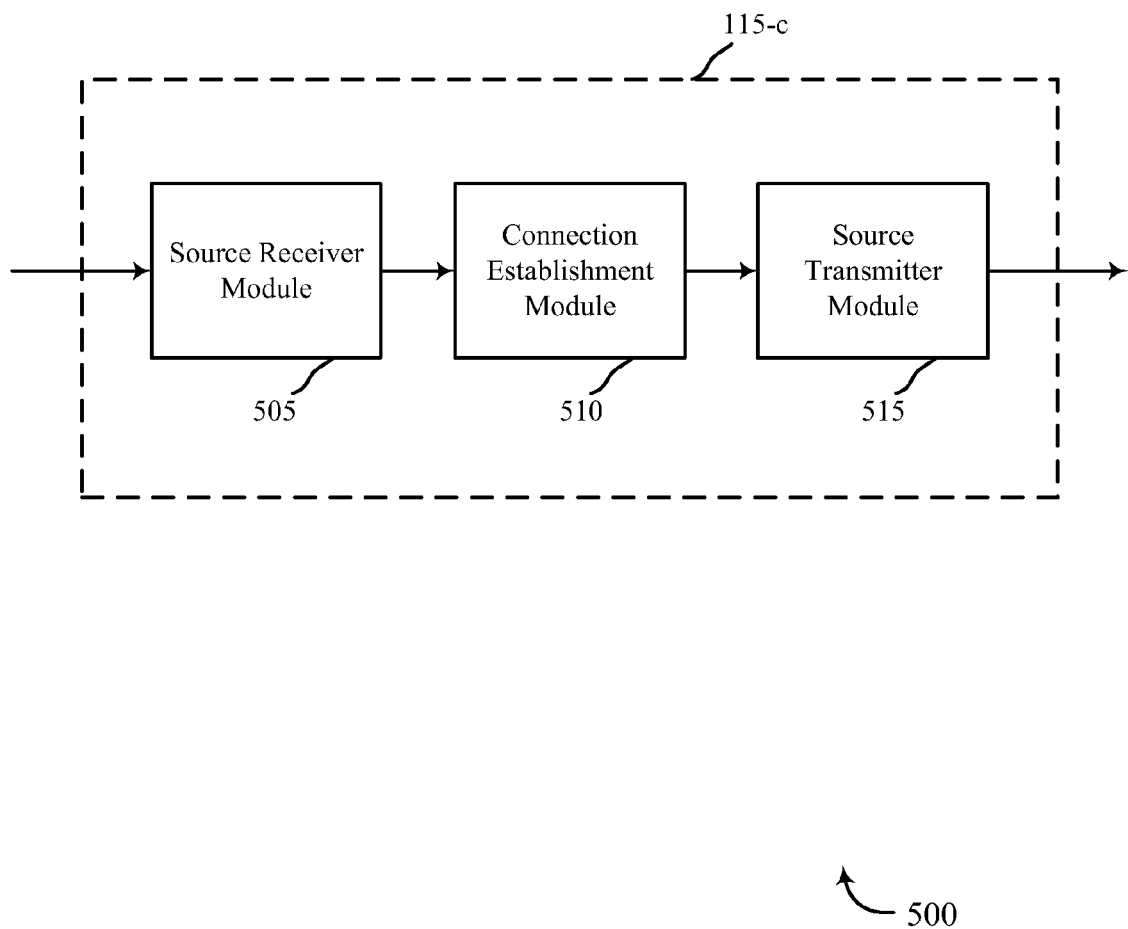
FIG. 5 is a block diagram illustrating a source device in accordance with various embodiments.

FIG. 5 is a block diagram 500 illustrating a source device 115-c in accordance with various embodiments. The source device 115-c may be an example of one or more aspects of one of the source devices 115 described with reference to FIG. 1. The device 115-c may also be a processor. The device 115-c may include a source receiver module 505, a connection establishment module 510, and a source transmitter module 515. Each of these components may be in communication with each other.

The components of the device 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source receiver module 505 may receive communications from a sink device, such as one or more of the sink devices 105 described with reference to FIG. 1. The received communications may be audio, voice, and/or video. The source receiver module 505 may receive these communications via a back channel of a Wi-Fi peer-to-peer remote display connection that is established between the source device 115-c and the sink device 105. The connection establishment module 510 may establish a Wi-Fi remote display connection with the sink device. The source transmitter module 515 may transmit information via a forward channel of the Wi-Fi remote display connection to the sink device 105. Details regarding the connection establishment module 510 will be described below.

Figure 6:
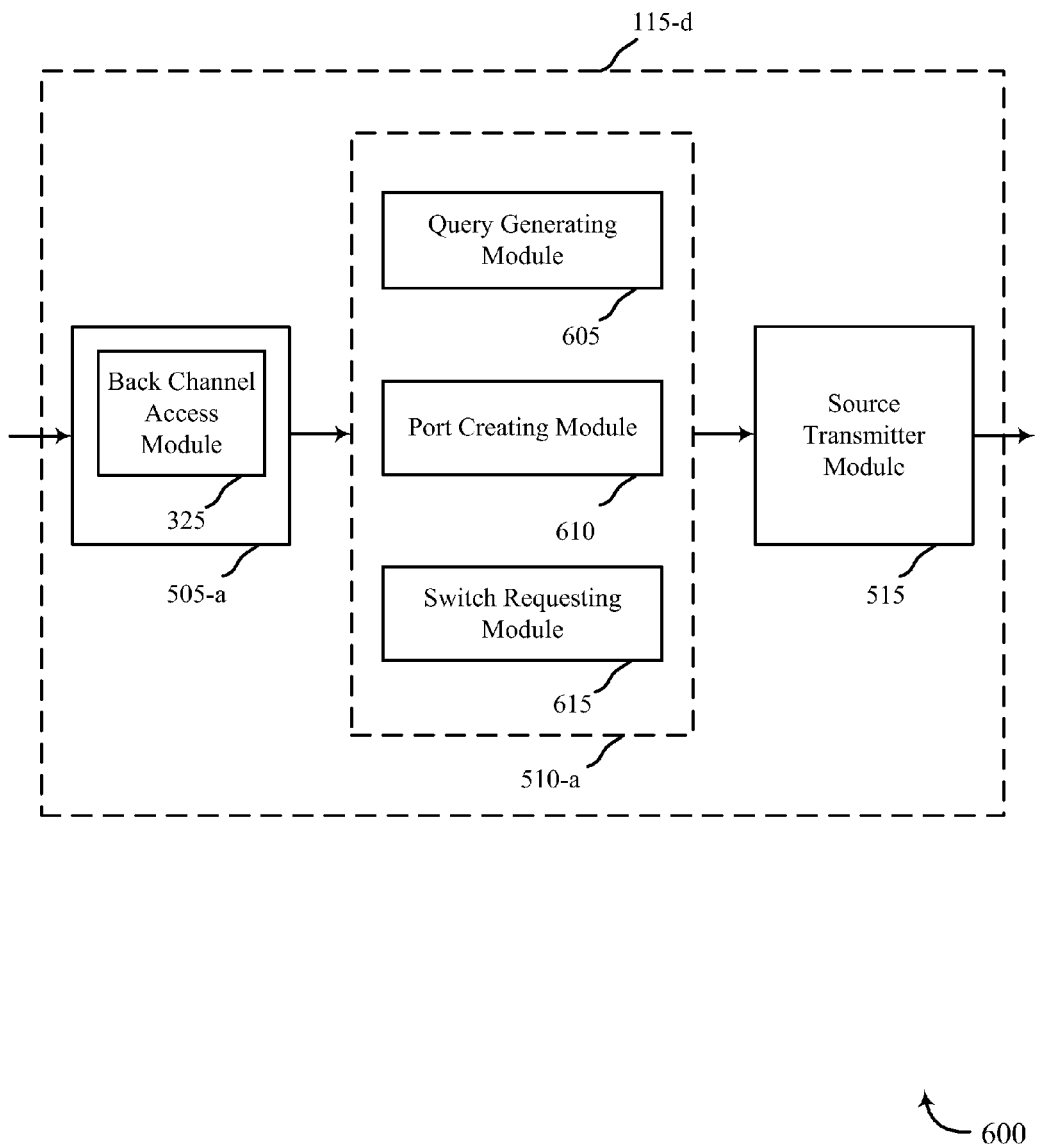
FIG. 6 illustrates another embodiment of the source device in accordance with various embodiments.

FIG. 6 is a block diagram 600 illustrating a source device 115-d in accordance with various embodiments. The source device 115-d may be an example of one or more aspects of one of the source devices 115 described with reference to FIGS. 1 and/or 5. The device 115-d may also be a processor. The device 115-d may include a source receiver module 505-a, a connection establishment module 510-a, and a source transmitter module 515. Each of these components may be in communication with each other.

The components of the device 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source transmitter module 515 may be configured as previously described with respect to FIG. 5. The source receiver module 505-a may include a back channel access module 325. The module 325 may access the back channel to receive, for example, audio communications transmitted from the sink device 105. The connection establishment module 510-a may establish a Wi-Fi peer-to-peer remote display connection and/or a back channel with the sink device 105. The module 510-a may include a query generating module 605, a port creating module 610, and a switch requesting module 615.

In one embodiment, the query generating module 605 may generate one or more queries for the sink device 105. In one example, the source device 115-d queries the sink device 105 for audio back channel support to check if the sink device 105 supports this feature. The query generating module 605 may also generate a query that queries the sink device 105 as to the audio types, and supported audio codecs and formats for audio and the RTP port profile information for the audio streaming in the back channel. The source device 115-d may initiate the establishment of a back channel if a back channel is needed for any voice or audio application the sink device 105 requests to launch at the source device 115-d. Further, the Source may select the port and codec parameters based on the settings of the forward link it is currently using in its Wi-Fi remote display session.

Upon receiving a response from the sink device 105 regarding the capabilities of the sink device 105, the query generating module 605 generates a message that includes the audio type, audio codec and parameters the source device 115-d desires to setup for subsequent audio streaming in the back channel. In one embodiment, Before sending such message to setup the back channel, the port creating module 610 creates a User Datagram Protocol (UDP) port or a Transmission Control Protocol (TCP) port that the source device 115-d will listen to for the back channel audio streaming. The RTP profile and port information may also be included in the message transmitted to the sink device 105 via the forward channel. The source device 115-d may receive a response from the sink device 105 acknowledging that that the sink device is ready to stream audio on the back channel.

In one configuration, when a Wi-Fi remote display connection is supported, the source device 115-d may either start establishing a Wi-Fi remote display connection or utilize an existing Wi-Fi remote display connection to establish a back channel. In one embodiment, a Wi-Fi remote display connection or a back channel may be initiated based on UPnP control messages passed by other connectivity media. The UPnP control messages may be exchanged, in one example, between a MirrorLink Server and a MirrorLink Client devices. In one example, the Wi-Fi remote display specific parameters may be inserted to expedite the establishment of the Wi-Fi remote display connection and/or the back channel.

During a communications session (e.g., audio streaming) on the back channel, the switch requesting module 615 may generate an RTSP setup message to change the audio type, codec and associated parameters. For example, the source device 115-d may need to switch from an audio streaming to a bi-directional voice call or vice-versa as required during the Universal Plug and Play (UPnP) control messages for starting certain applications on the source device 115-d. In addition, the source device 115-d may transmit a request to the sink device 105 to de-activate back channel streaming of audio based on a voice/audio application executing on the source device 115-d, or due to user intervention. The source device 115-d may later send a request to the sink device 105 to resume the audio streaming, for example.

In one embodiment, during the capability negotiation procedure, the source device 115-d may query the sink device 105 for UIBC capabilities to check if the sink device 105 supports this feature. The query may also include a request for the parameters to use for this feature. The sink device 105 may respond with the UIBC specific parameters, a list of audio types, audio codecs and parameters it supports for back channel audio streaming and the RTP port profile information for the audio streaming in the back channel. The source device 115-d may then send the audio type, audio codec and parameters it desires to setup for the subsequent audio streaming in the back channel within a Real-time Streaming Protocol (RTSP) data structure used for UIBC. Before sending such message to setup the channel, the source device 115-d first creates the UDP or TCP port as previously described. When the source decides to use the TCP port, it may use the same TCP port created for the UIBC for the purpose of back channel audio streaming.

Figure 7:
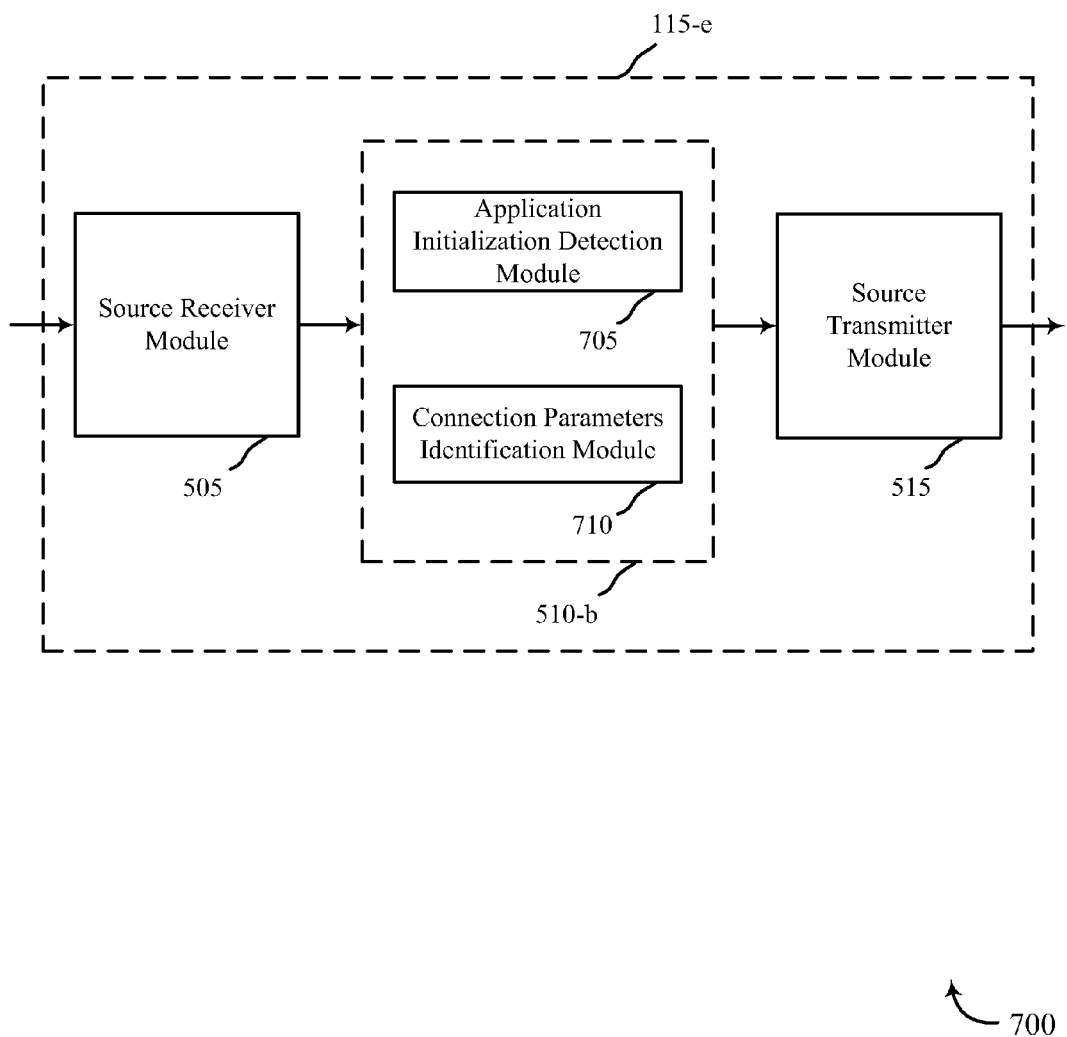
FIG. 7 is a block diagram illustrating a further embodiment of the source device in accordance with various embodiments.

FIG. 7 is a block diagram 700 illustrating a source device 115-e in accordance with various embodiments. The source device 115-e may be an example of one or more aspects of one of the source devices 115 described with reference to FIGS. 1, 5, and/or 6. The device 115-e may also be a processor. The device 115-e may include a source receiver module 505, a connection establishment module 510-b, and a source transmitter module 515. Each of these components may be in communication with each other.

The components of the device 115-e may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source receiver module 505 and the source transmitter module 515 may be configured as previously described with respect to FIGS. 5 and/or 6. In one configuration, the connection establishment module 510-b may include an application initialization detection module 705 and a connection parameters identification module 710.

In one embodiment, during a Wi-Fi remote display connection setup procedure, the source device 115-e and sink device 105 may transmit multiple information elements (IEs) for device discovery. The capability to support the audio in the back channel may be indicated by a bit in a Wi-Fi remote display Extended Capability sub-element inside a Wi-Fi remote display IE. Once the Wi-Fi remote display connection is established, UPnP communication between the devices may begin. The application initialization detection module 705 may detect the launch of an application that may require an audio link. Upon detecting this launch, the source device 115-*e* may initiate a suitable audio link (e.g., back channel only link or bi-directional). The type of link may also be identified (media, voice, video, etc.). While the detection of the application launch is described with respect to the source device 115-*e*, it is to be understood that the sink device 105 may also detect the launch of an application at the source device 115-*e* and initiate a back channel for audio, voice, etc. communications.

In one embodiment, the source device 115-*e* and sink device 105 may establish a Wi-Fi peer-to-peer remote display connection using the Wi-Fi connection related parameters exchanged from an existing wired connection. For example, additional information during advertisement of connectivity attributes may be useful when an alternative link is used to carry the connectivity parameters of another media (e.g., Wi-Fi connection parameters sent through Universal Serial Bus (USB) connection). When a server (e.g., the source device 115-*e*) and a client (e.g., the sink device 105) are already connected through some other media such as USB, the additional information required to establish a Wi-Fi remote display connection may be transmitted via the USB connection to initiate the connection when applications need this type of connection. For example, Wi-Fi remote display device discovery may be accelerated when Wi-Fi remote display Device Information sub-element of Wi-Fi remote display IE can be included in a Server Device advertisement message.

In one example, the connection parameters identification module 710 may identify various parameters transmitted via the existing wired connection to establish the Wi-Fi remote display connection. For example, Wi-Fi peer-to-peer (P2P) capability attributes and other parameters such as P2P Device Information, P2P Group Information, requested device type attribute, and P2P Interface Address may be identified by the module 710. These parameters may be useful to establish a P2P connection and provisioning faster by shortening the P2P device discovery procedure, such as directly joining the known Group or communicate to the known P2P device type and/or device address. Wi-Fi P2P service discovery and Wi-Fi remote display service discovery parameters may also be identified by the module 710 and used to facilitate these actions if supported. For applications like audio or video, the Wi-Fi remote display connection may be initialized as needed with the assistance of pre-shared information on Wi-Fi P2P capability and device identification.

Figure 8:
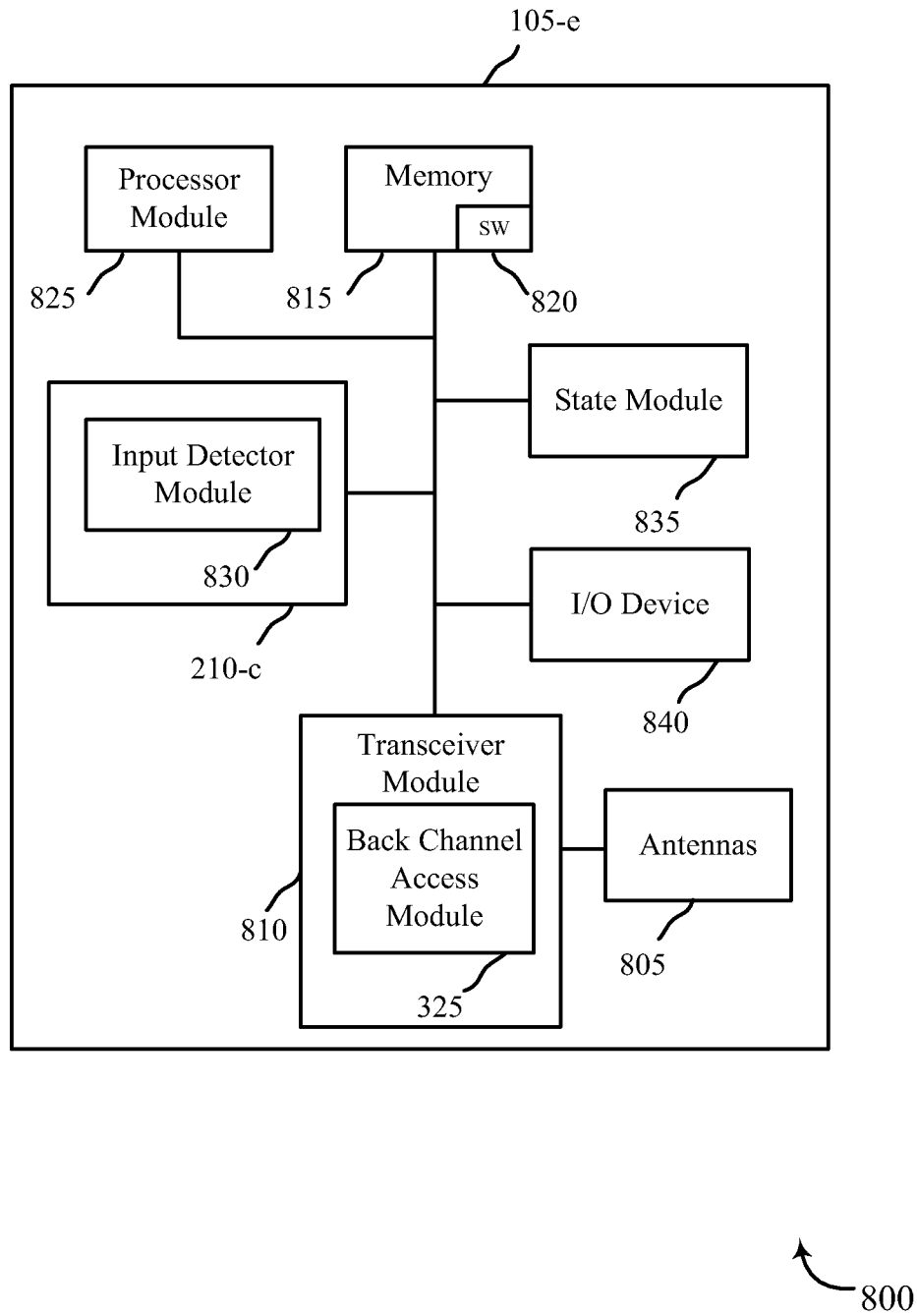
FIG. 8 is a block diagram of one configuration of a sink device.

FIG. 8 is a block diagram 800 of a sink device 105-*e*. This may be the sink device 105 of FIGS. 1, 2, 3 and/or 4. The sink device 105-*e* may have any of various configurations, such as in-vehicle infotainment devices, digital televisions, personal computers (e.g., laptop computers, netbook computers, tablet computers, etc.), cellular telephones, PDAs, digital video recorders (DVRs), internet appliances, gaming consoles, e-readers, etc. The sink device 105-*e* may have an internal power supply (not shown), such as a small battery, to facilitate mobile operation.

The sink device 105-*e* includes antennas 805, a transceiver module 810, memory 815, and a processor module 825, which each may be in communication, directly or indirectly, with each other (e.g., via one or more buses). The transceiver module 810 is configured to communicate bi-directionally, via the antennas 805 and/or one or more wired or wireless links, with one or more networks, as described above. For example, the transceiver module 810 may be configured to communicate bi-directionally with source devices 115 of FIGS. 1, 5, 6, and/or 7. The transceiver module 810 may include the back channel access module 325 to send transmissions to the source device 115. The transceiver module 810 may also include the sink receiver module 205 and the sink transmitter module 215 of FIGS. 2, 3, and/or 4, as previously described. In one embodiment, the transceiver module 810 may further include a modem configured to modulate the packets and provide the modulated packets to the antennas 805 for transmission, and to demodulate packets received from the antennas 805. While the sink device 105-*e* may include a single antenna, the sink device 105-*e* will typically include multiple antennas 805 for multiple links.

The memory 815 may include random access memory (RAM) and read-only memory (ROM). The memory 815 may store computer-readable, computer-executable software code 820 containing instructions that are configured to, when executed, cause the processor module 825 to perform various functions described herein (e.g., Wi-Fi remote display connection setup, audio back channel setup, etc.). Alternatively, the software 820 may not be directly executable by the processor module 825 but be configured to cause the computer (e.g., when compiled and executed) to perform functions described herein.

The processor module 825 may include an intelligent hardware device, e.g., a central processing unit (CPU), a microcontroller, an application specific integrated circuit (ASIC), etc. The processor module 825 may include a speech encoder (not shown) configured to receive audio via a microphone, convert the audio into packets (e.g., 30 ms in length) representative of the received audio, provide the audio packets to the transceiver module 810, and provide indications of whether a user is speaking. Alternatively, an encoder may only provide packets to the transceiver module 810, with the provision or withholding/suppression of the packet itself providing the indication of whether a user is speaking.

According to the architecture of FIG. 8, the sink device 105-*e* further includes a communications management module 210-*c* and a state module 835. The communications management module 210-*c* may manage communications with other devices, such as other source devices 115. By way of example, the communications management module 210-*c* may be a component of the sink device 105-*e* in communication with some or all of the other components of the sink device 105-*e* via a bus. Alternatively, functionality of the communications management module 210-*c* may be implemented as a component of the transceiver module 810, as a computer program product, and/or as one or more controller elements of the processor module 825. The state module 835 may reflect and control the current device state (e.g., context, authentication, P2P association and provisioning, other connectivity issues). The sink device 105-*e* may further include one or more input/output (I/O) devices 840. These may include microphones, speakers, a display, etc. Voice commands and/or voice communications received at a microphone may be transmitted via a back channel to one or more source devices 115, as previously described. An input detector module 830 may detect when input is capture at the microphone. The setup of the back channel may be initialized upon detecting this input. In addition, if the back channel is already in use for audio streaming, for example, the detection of voice commands and/or voice communications at the microphone may cause the audio streaming to be suspended so that the voice may be transmitted to the source device 115 over the back channel.

The components of the sink device 105-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the sink device 105-*e*.

Figure 9:
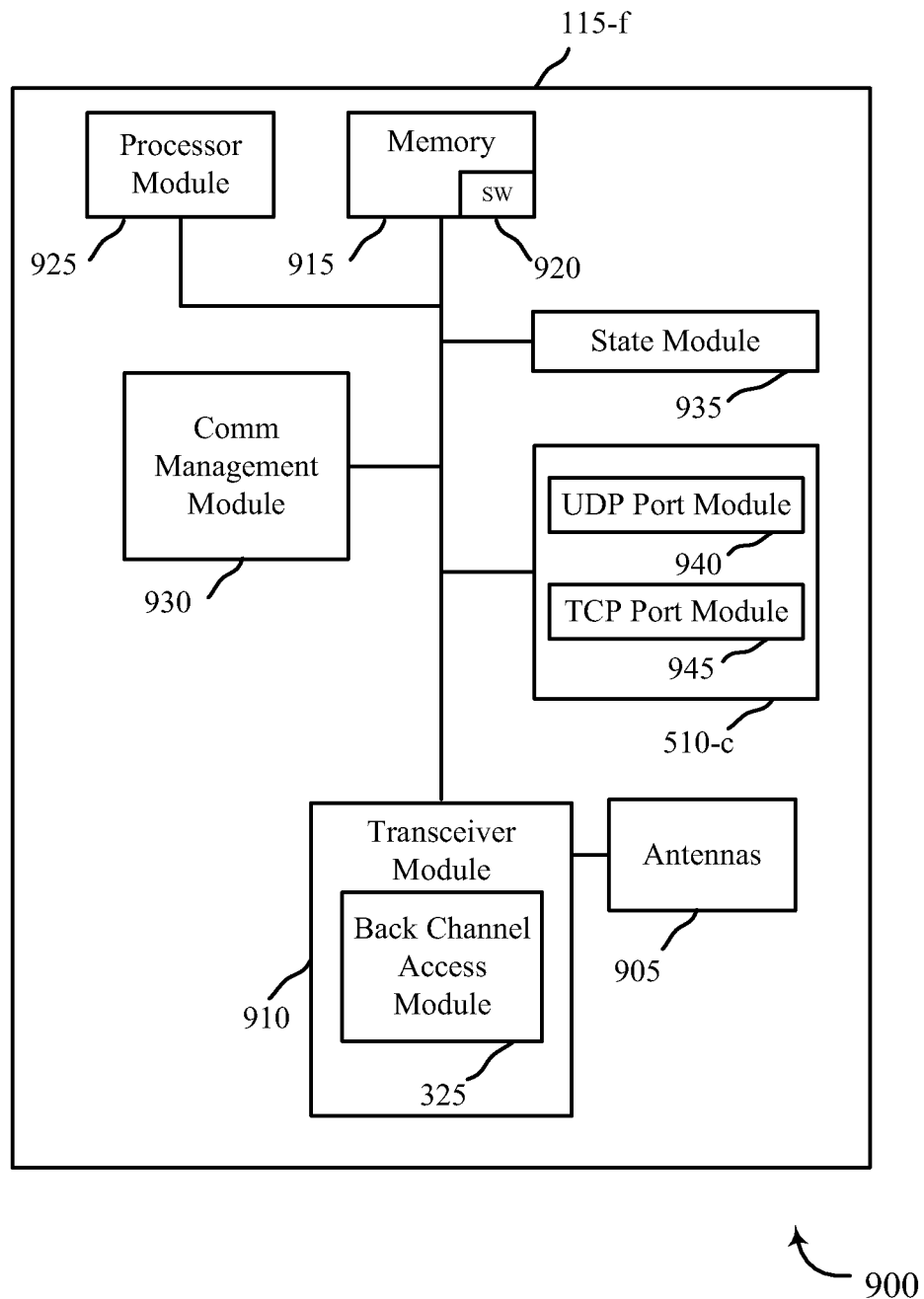
FIG. 9 is a block diagram of one embodiment of a source device.

FIG. 9 is a block diagram 900 of a source device 115-*f*. This may be the source device 115 of FIGS. 1, 5, 6, and/or 7. The source device 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The source device 115-*f* may have an internal power supply (not shown), such as a small battery, to facilitate mobile operation.

The source device 115-*f* includes antennas 905, a transceiver module 910, memory 915, and a processor module 925, which each may be in communication, directly or indirectly, with each other (e.g., via one or more buses). The transceiver module 910 is configured to communicate bi-directionally, via the antennas 905 and/or one or more wired or wireless links, with one or more networks, as described above. For example, the transceiver module 910 may be configured to communicate bi-directionally with sink devices 105 of FIGS. 1, 2, 3, and/or 4. The transceiver module 910 may also receive communications from the sink device 105, without transmitting communications to the sink device 105. The transceiver module 910 may include the back channel access module 325 to receive transmissions from the sink device 105. The transceiver module 910 may also include the source receiver module 505 and the source transmitter module 515 of FIGS. 5, 6, and/or 7, as previously described. The transceiver module 910 may include a modem configured to modulate the packets and provide the modulated packets to the antennas 905 for transmission, and to demodulate packets received from the antennas 905. While the source device 115-*f* may include a single antenna, the source device 115-*f* will typically include multiple antennas 905 for multiple links.

The memory 915 may include random access memory (RAM) and read-only memory (ROM). The memory 915 may store computer-readable, computer-executable software code 920 containing instructions that are configured to, when executed, cause the processor module 925 to perform various functions described herein (e.g., Wi-Fi remote display connection setup, audio back channel setup, etc.). Alternatively, the software 920 may not be directly executable by the processor module 925 but be configured to cause the computer (e.g., when compiled and executed) to perform functions described herein.

The processor module 925 may include an intelligent hardware device, e.g., a central processing unit (CPU), a microcontroller, an application specific integrated circuit (ASIC), etc. The processor module 925 may include a speech encoder (not shown) configured to receive audio via a microphone, convert the audio into packets (e.g., 30 ms in length) representative of the received audio, provide the audio packets to the transceiver module 910, and provide indications of whether a user is speaking. Alternatively, an encoder may only provide packets to the transceiver module 910, with the provision or withholding/suppression of the packet itself providing the indication of whether a user is speaking.

According to the architecture of FIG. 9, the source device 115-*f* further includes a communications management module 930 and a state module 935. The communications management module 930 may manage communications with other source devices 115 and sink devices 105. By way of example, the communications management module 930 may be a component of the source device 115-*f* in communication with some or all of the other components of the source device 115-*f* via a bus. Alternatively, functionality of the communications management module 930 may be implemented as a component of the transceiver module 910, as a computer program product, and/or as one or more controller elements of the processor module 925. The state module 935 may reflect and control the current device state (e.g., context, authentication, P2P association, provisioning, other connectivity issues).

The source device 115-*f* may further include the connection establishment module 510-*c*. The module 510-*c* may include a UDP port module 940 and a TCP port module 945. The UDP port module 940 may create or open a UDP port when latency intolerant communications are to be received on the back channel, such as voice communications. The TCP port module 945 may open or create a TCP port when communications that are latency tolerant are to be received on the back channel. This may include audio streaming from the sink device 105 to the source device 115-*f*.

The components of the source device 115-*f* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the source device 115-*f*.

Figure 10:
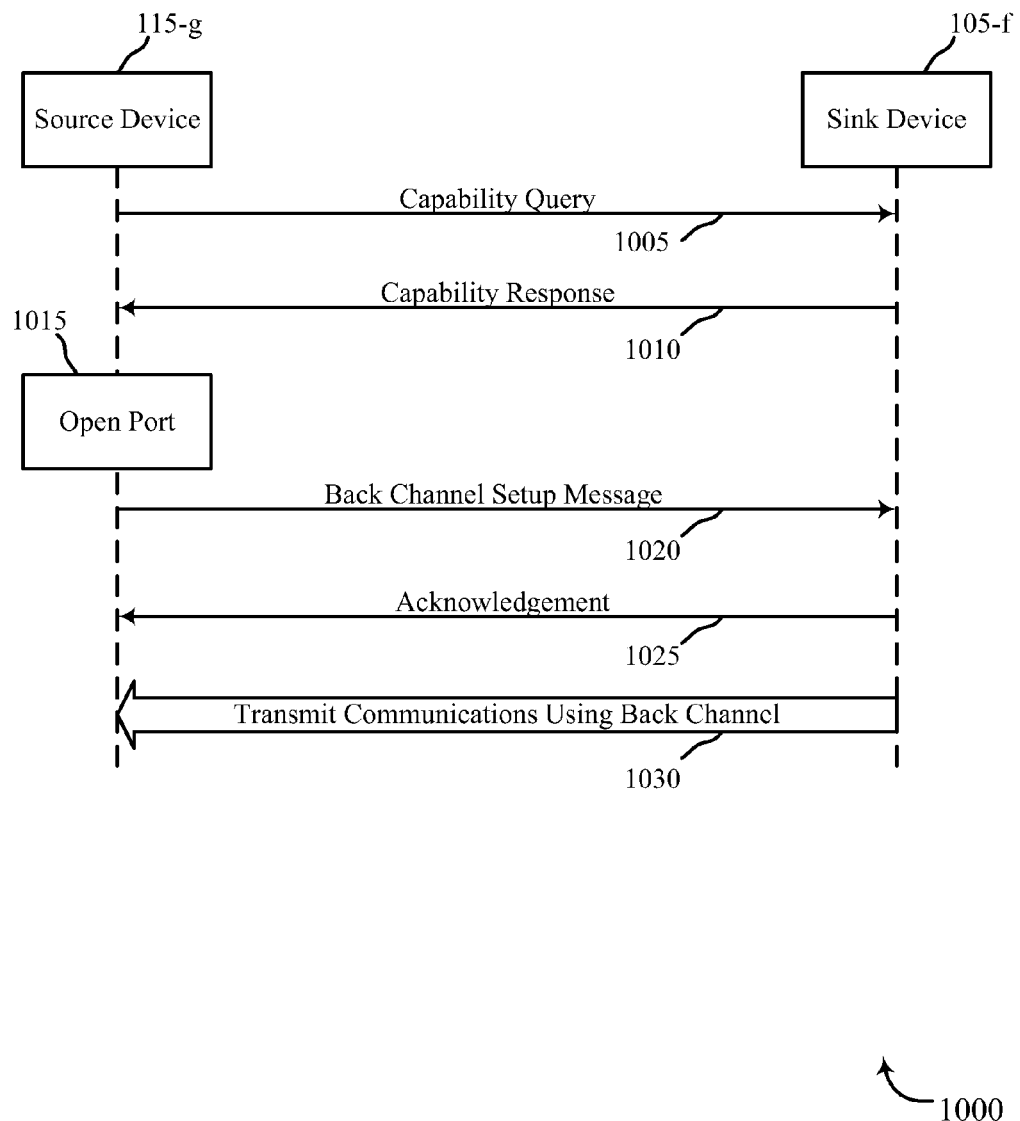
FIGS. 10-13 are message flow diagrams illustrating one embodiment of a flow of communications between a source device and a sink device.

FIG. 10 is a message flow diagram 1000 illustrating one example of communications between a source device 115-*g* and sink device 105-*f*. The source device 115-*g* may be an example of the devices 115 of FIGS. 1, 5, 6, 7, and/or 9. The sink device 105-*f* may be an example of the sink devices 105 illustrated in FIGS. 1, 2, 3, 4, and/or 8.

In one configuration, the source device 115-*g* and the sink device 105-*f* may be connected via a Wi-Fi peer-to-peer remote display connection. The source device 115-*g* may send a capability query 1005 to the sink device 105-*f* using a RTSP Request message. The query may inquire the sink device 105-*f* regarding its capabilities to communicate audio, voice, etc. via a back channel of a Wi-Fi peer-to-peer remote display communication. In one example, the format of the query may be M3-RTSP GET_PARAMETER Request (wfd_abc_capability) where "wfd" represents Wi-Fi remote display and "abc" represents Audio Back Channel. As previously described, the source device 115-*g* may also query the sink device 105-*f* regarding its UIBC capability. As a result, the format of the query may be M3-RTSP GET_PARAMETER Request (wfd_uibc_capability).

The sink device 105-*f* may respond with a capability response 1010. The format of the response, in one example, may be M3 Response (wfd_abc_capability: abc_cap_list=<audio_type> <audio_format> <modes> <latency>, . . . ; wfd_backchannel_rtp_ports: RTP/AVP/UDP; unicast mode=play). If the sink device 105-*f* responds with UIBC capability information, the format of the response, in another example, may be M3 Response (wfd_uibc_capability: input_category_list=VENDOR_SPECIFIC; generic_cap_list=none; hidc_cap_list=none; vendor_specific_cap_info=OUI: 04DF69; ccc_event_cap_list=none; ccc_abc_cap_list=VOICE/AUDIO, LPCM <modes> <latency>, . . . ; abc_port=none.

In one configuration, upon receiving the capability response, the source device 115-*g* may open a port 1015. For example, the source device 115-*g* may create a UDP or TCP port it will be listening in for back channel audio streaming.

In one configuration, the source device 115-*g* may send a back channel setup message 1020 to the sink device 105-*f*. The format of the setup message may be M4/M17-RTSP SET_PARAMETER Request (wfd_abc_capability: abc_cap_list=<audio_type> <audio_format (codec-a)> <modes> <latency>; wfd_backchannel_rtp_ports: RTP/AVP/UDP; unicast IPPORT mode=play); wfd-abc-setting: enable). If UIBC is supported and the peer devices are capable to exchange the audio back channel parameters through UIBC signaling, the format of the setup message, in one example, may be M4/M14-RTSP SET_PARAMETER Request (wfd_uibc_capability: input_category_list=VENDOR_SPECIFIC; generic_cap_list=none; hidc_cap_list=none; vendor_specific_cap_info=OUI: 04DF69; ccc_event_cap_list=none; ccc_abc_cap_list=<codec-a format>; abc_port=UDP port: IPPORT, wfd-uibc-setting: enable).

Upon receiving the back channel setup message, the sink device 105-*f* may respond with an acknowledgment 1025. The sink device 105-*f* may then transmit communications to the source device 115-*g* using the back channel 1030. The communications may be transmitted according to the parameters provided by the source device 115-*g* in the setup message 1020.

Figure 11:
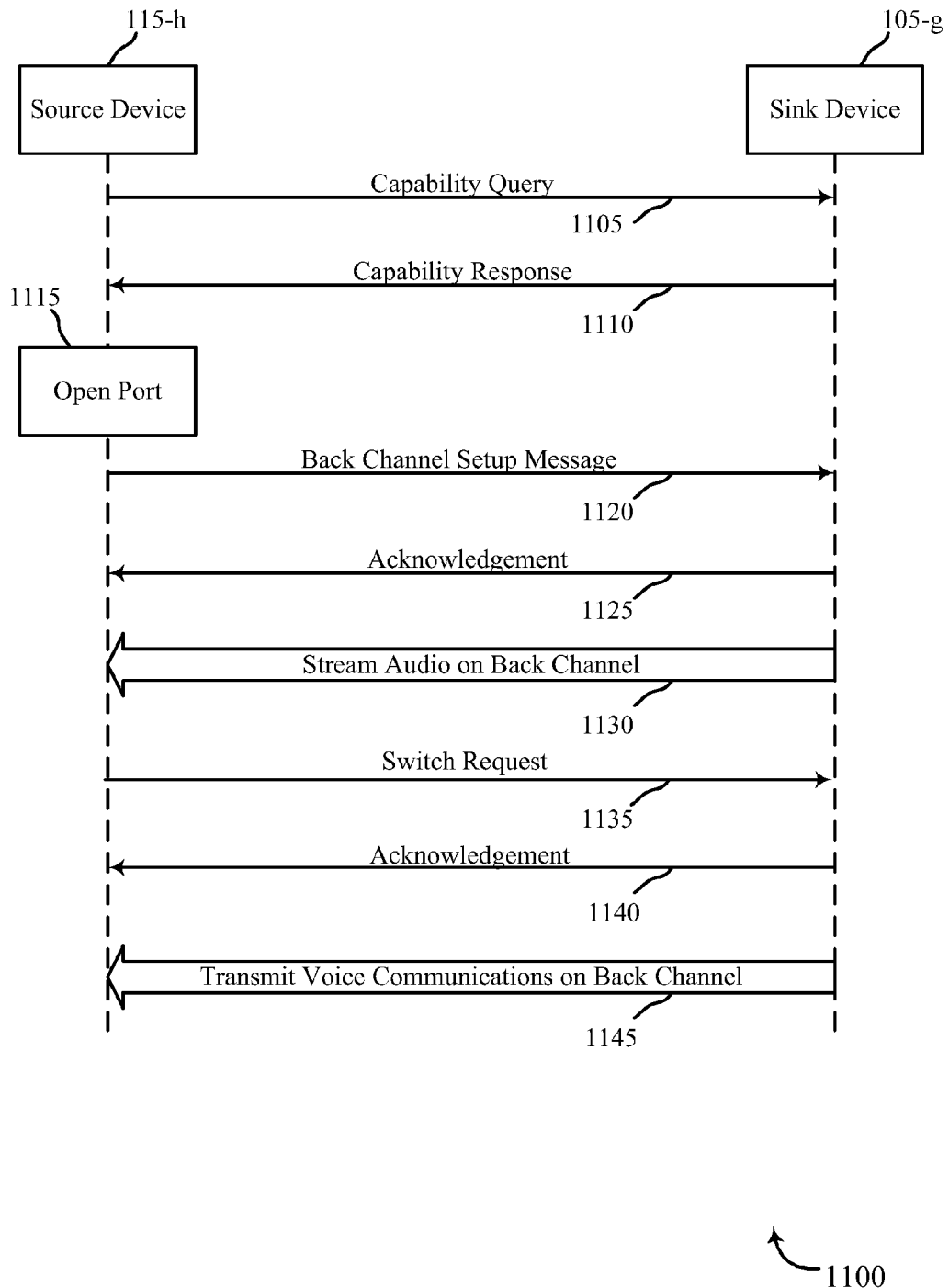

FIG. 11 is a message flow diagram 1100 illustrating one example of communications between a source device 115-*h* and sink device 105-*g*. The source device 115-*h* may be an example of the devices 115 of FIGS. 1, 5, 6, 7, 9, and/or 10. The sink device 105-*g* may be an example of the sink devices 105 illustrated in FIGS. 1, 2, 3, 4, 8, and/or 10.

In one configuration, the source device 115-*h* and the sink device 105-*g* may be connected via a Wi-Fi peer-to-peer remote display connection. The source device 115-*h* may send a capability query 1105 to the sink device 105-*g*, as previously described. The sink device 105-*g* may respond with a capability response 1110, as previously described. In one configuration, upon receiving the capability response, the source device 115-*h* may open a port 1115 to listen for audio and/or voice on the back channel.

In one configuration, the source device 115-*h* may send a back channel setup message 1120 to the sink device 105-*g*. Upon receiving the back channel setup message, the sink device 105-*g* may respond with an acknowledgment 1125. The sink device 105-*g* may then stream audio to the source device 115-*h* using the back channel 1130. The audio may be streamed according to the parameters provided by the source device 115-*h* in the setup message 1120.

In one embodiment, the source device 115-*h* may transmit a switch request 1135 to the sink device 105-*g*. The switch request may be sent by using an RTSP SET_PARAMETER Request message with new wfd_abc_capability parameters and may request a switch from audio streaming on the back channel, to receiving voice via the back channel. In one configuration, the sink device 105-*g* may initiate the switch instead of receiving a request from the source device 115-*h*. The sink device 105-*g* may initiate the switch when the sink device 105-*g* launches an application at the source device 115-*h* that is configured for voice communications (e.g., bi-directional phone calls, voice commands, etc.). If the sink device 105-*g* receives a switch request, it may respond with an acknowledgment 1140. If the sink device initiates the switch, it may transmit a notification to the source device 115-*h* that a switch is about to occur. Following the switch, the sink device 105-*g* may transmit voice communications on the back channel 1145. The voice communications may be related to a bi-directional phone call, voice commands, and the like.

Figure 12:
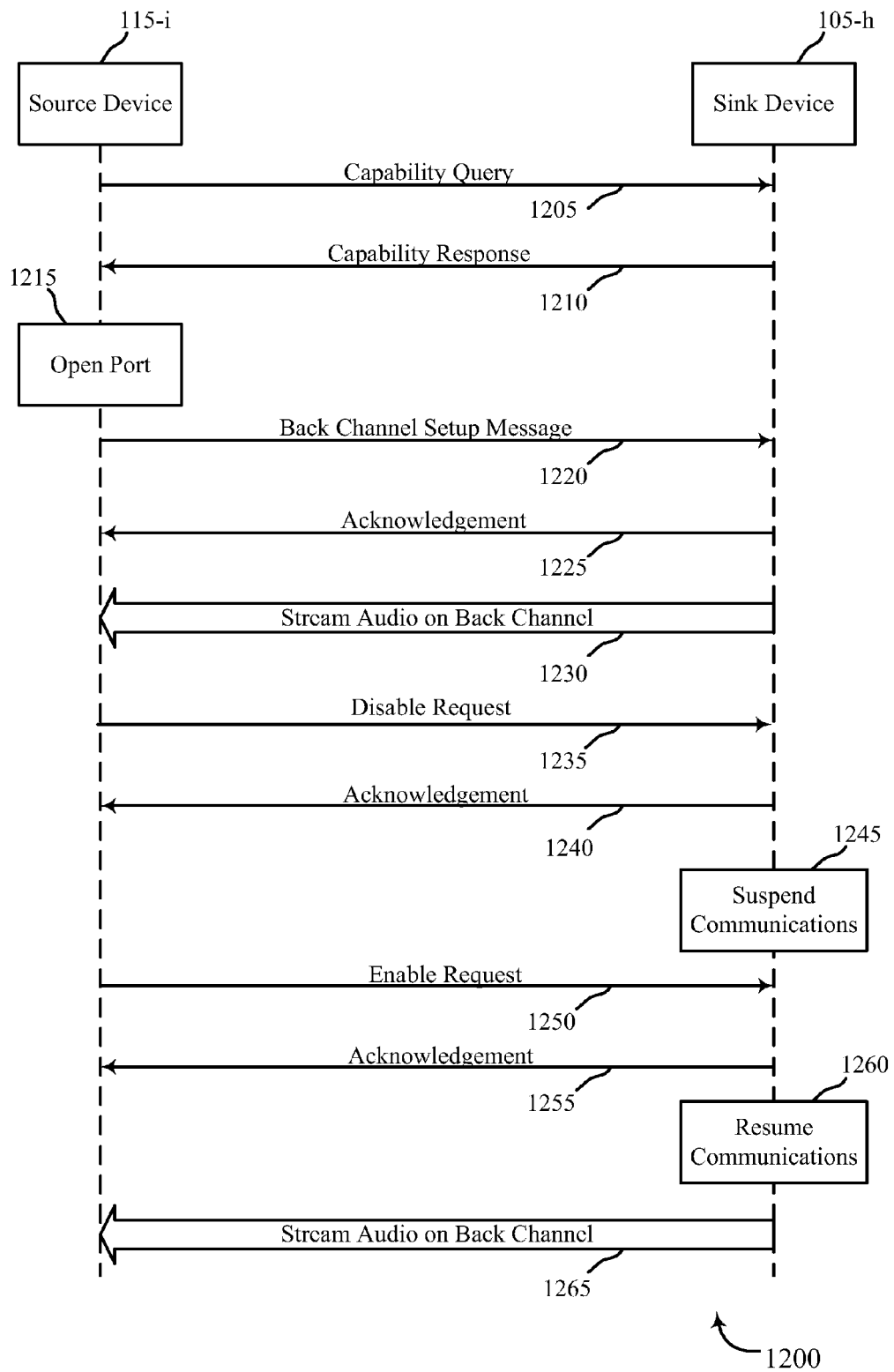

FIG. 12 is a message flow diagram 1200 illustrating one example of communications between a source device 115-*i* and sink device 105-*h*. The source device 115-*i* may be an example of the devices 115 of FIGS. 1, 5, 6, 7, 9, 10, and/or 11. The sink device 105-*h* may be an example of the sink devices 105 illustrated in FIGS. 1, 2, 3, 4, 8, 10, and/or 11.

In one configuration, the source device 115-*i* and the sink device 105-*h* may be connected via a Wi-Fi peer-to-peer remote display connection. The source device 115-*i* may send a capability query 1205 to the sink device 105-*h*, as previously described. The sink device 105-*h* may respond with a capability response 1210, as previously described. In one configuration, upon receiving the capability response, the source device 115-*i* may open a port 1215 to listen for audio and/or voice on the back channel.

In one configuration, the source device 115-*i* may send a back channel setup message 1220 to the sink device 105-*h*. Upon receiving the back channel setup message, the sink device 105-*h* may respond with an acknowledgment 1225. The sink device 105-*h* may then stream audio to the source device 115-*i* using the back channel 1230. The audio may be streamed according to the parameters provided by the source device 115-*i* in the setup message 1220.

In one embodiment, the source device 115-*i* may transmit a disable request 1235 to the sink device 105-*h*. The disable request may request that communications on the back channel be suspended. For example, the source device 115-*i* may be receiving audio streaming via the back channel. An incoming/outgoing call at the source device 115-*i* may necessitate that the audio streaming be suspended so that voice communications may be transmitted via the back channel. The format of the disable request may be M18-RTSP SET_PARAMETER Request (wfd_abc_setting: disable). If UIBC is supported and it is being used for establishing the audio back channel, the format of the disable request may be M15-RTSP SET_PARAMETER Request (wfd_uibc_setting: disable).

Upon receiving the request, the sink device 105-*h* may respond with an acknowledgment 1240 and suspend the communications 1245 on the back channel. In one example, the sink device 105-*h* may disable the communications without receiving a request from the source device 115-*i*. For example, when the sink device 105-*h* launches a particular application at the source device 115-*i*, the sink device 105-*h* may suspend communication 1245.

In one configuration, the source device 115-*i* may transmit an enable request 1250 to the sink device 105-*h*. The format of the enable request may be M18-RTSP SET_PARAMETER Request (wfd_abc_setting: enable) or M15-RTSP SET_PARAMETER Request (wfd_uibc_setting: enable), if UIBC is supported and it is being used for providing audio back channel functions.

The sink device 105-*h* may respond with an acknowledgment 1255 to resume communications 1260 on the back channel. The sink device 105-*h* may resume the communications 1260 without receiving an enable request 1250 from the source device 115-*i*. Once communications are resumed, the sink device 105-*h* may stream audio on the back channel 1265 to the source device 115-*i*.

Figure 13:
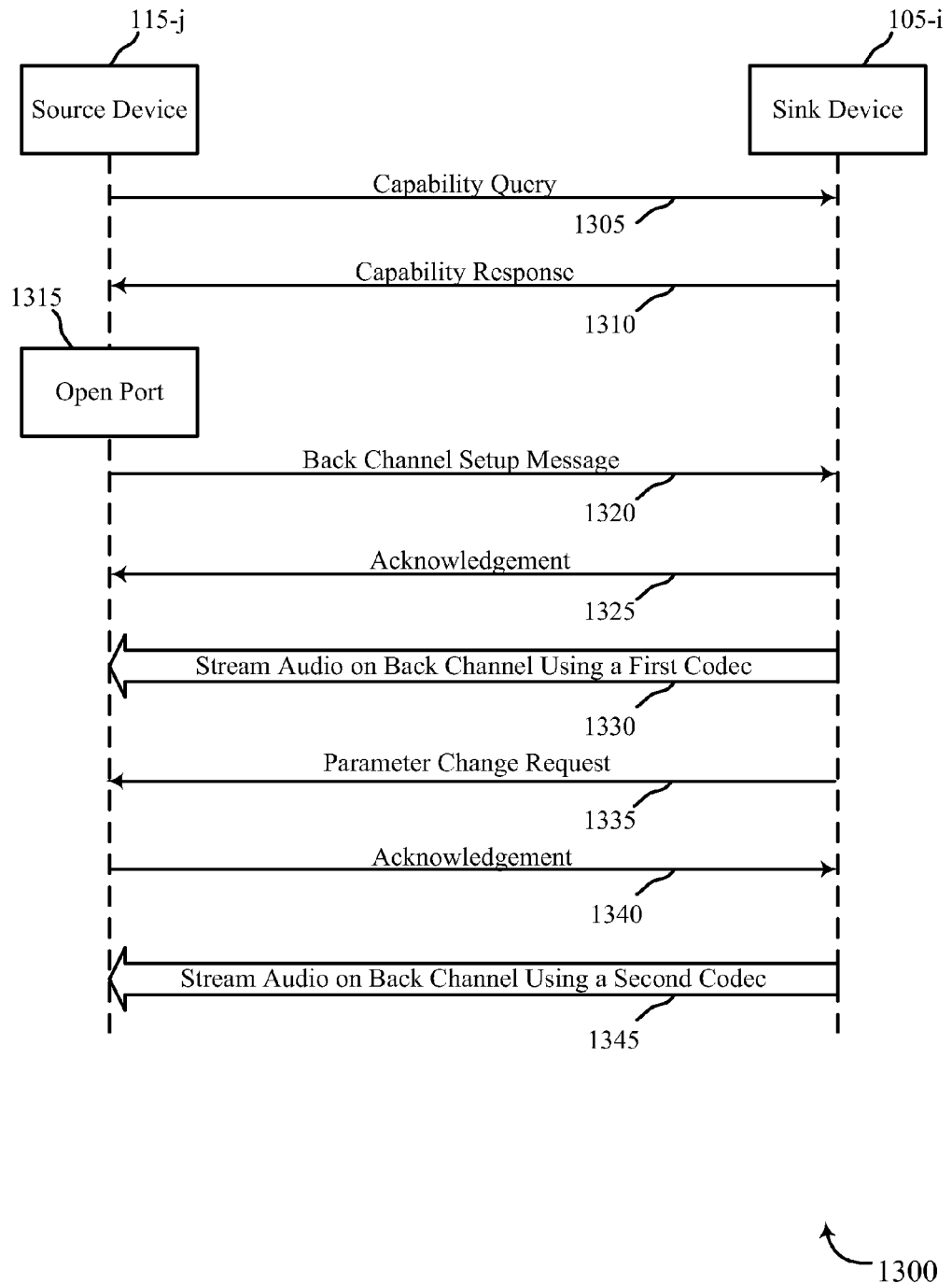

FIG. 13 is a message flow diagram 1300 illustrating one example of communications between a source device 115-*j* and sink device 105-*i*. The source device 115-*j* may be an example of the devices 115 of FIGS. 1, 5, 6, 7, 9, 10, 11, and/or 12. The sink device 105-*i* may be an example of the sink devices 105 illustrated in FIGS. 1, 2, 3, 4, 8, 10, 11, and/or 12.

In one configuration, the source device 115-*j* and the sink device 105-*i* may be connected via a Wi-Fi peer-to-peer remote display connection. The source device 115-*j* may send a capability query 1305 to the sink device 105-*i*, as previously described. The sink device 105-*i* may respond with a capability response 1310, as previously described. In one configuration, upon receiving the capability response, the source device 115-*j* may open a port 1315 to listen for audio and/or voice on the back channel.

In one configuration, the source device 115-*j* may send a back channel setup message 1320 to the sink device 105-*i*. Upon receiving the back channel setup message, the sink device 105-*i* may respond with an acknowledgment 1325. The sink device 105-*i* may then stream audio to the source device 115-*j* using the back channel 1330. The audio may be streamed using a first codec that was provided by the source device 115-*j* in the setup message 1320.

In one embodiment, the sink device 105-*i* may transmit a parameter change request 1335 to the source device 115-*j*. The parameter change request may request that the codec currently used for audio streaming on the back channel be changed to a second codec. The format of the parameter change request may be M17-RTSP SET_PARAMETER Request (wfd_abc_capability: (codec-b parameters) . . . ) or M14-RTSP SET_PARAMETER Request (wfd_uibc_capability: . . . ccc_abc_cap_list=<codec-b format> . . . ), where codec-b is the new codec that will be used to stream the audio.

Upon receiving the parameter change request, the source device 115-*j* may respond with an acknowledgment 1340. The sink device 105-*i* may then stream the audio on the back channel using the second codec 1345.

Figure 14:
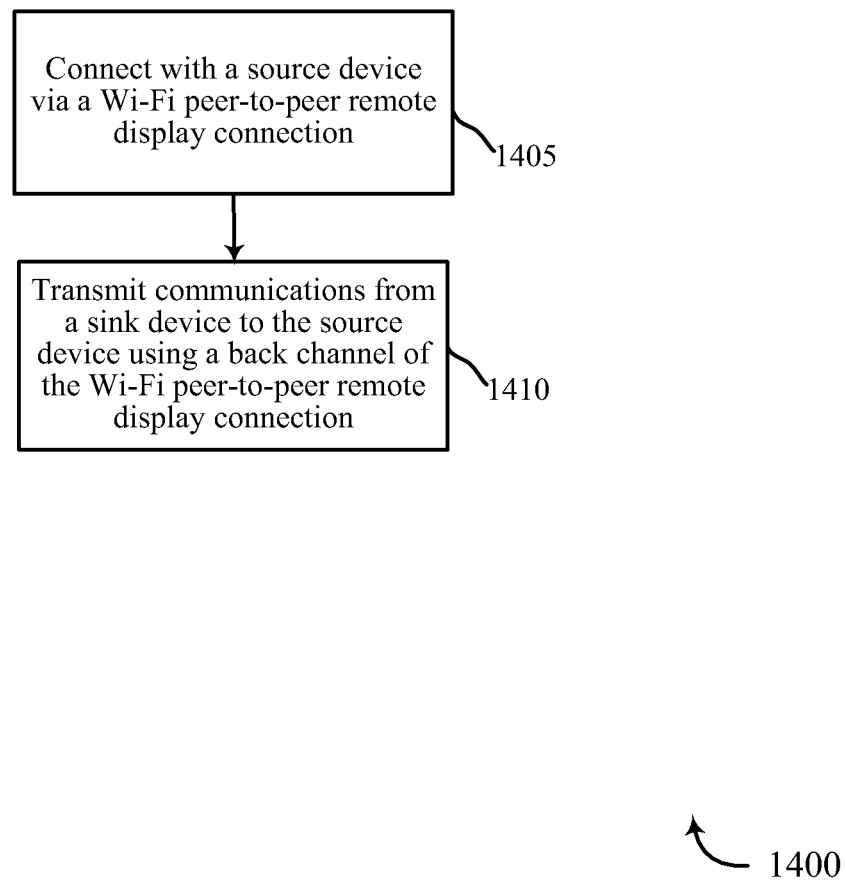
FIG. 14 is a flow chart illustrating an embodiment of a method for establishing a back channel for audio and/or voice communications in a Wi-Fi remote display connection.

FIG. 14 is a flow chart illustrating an embodiment of a method 1400 for establishing a back channel for audio and/or voice communications in a Wi-Fi remote display connection. For clarity, the method 1400 is described below with reference to the wireless communications system 100 shown in FIG. 1, and/or with reference to one of the sink devices 105 described with reference to FIGS. 1, 2, 3, 4, 8, 10, 11, 12, and/or 13. In one implementation, the communications management module 210 described with reference to FIGS. 2, 3, 4, and/or 8 may execute one or more sets of codes to control the functional elements of a sink device 105 to perform the functions described below.

In one embodiment, at block 1405, the sink device 105 may connect with a source device 115 via a Wi-Fi peer-to-peer remote display connection. At block 1410, communications may be transmitted from the sink device 105 to the source device 115 using a back channel of the Wi-Fi peer-to-peer remote display connection. The communications may be a stream of audio, voice, video, etc.

Therefore, the method 1400 may be used to establish a back channel in a Wi-Fi peer-to-peer remote display connection. It should be noted that the method 1400 is just one implementation and that the operations of the method 1400 may be rearranged or otherwise modified such that other implementations are possible.

Figure 15:
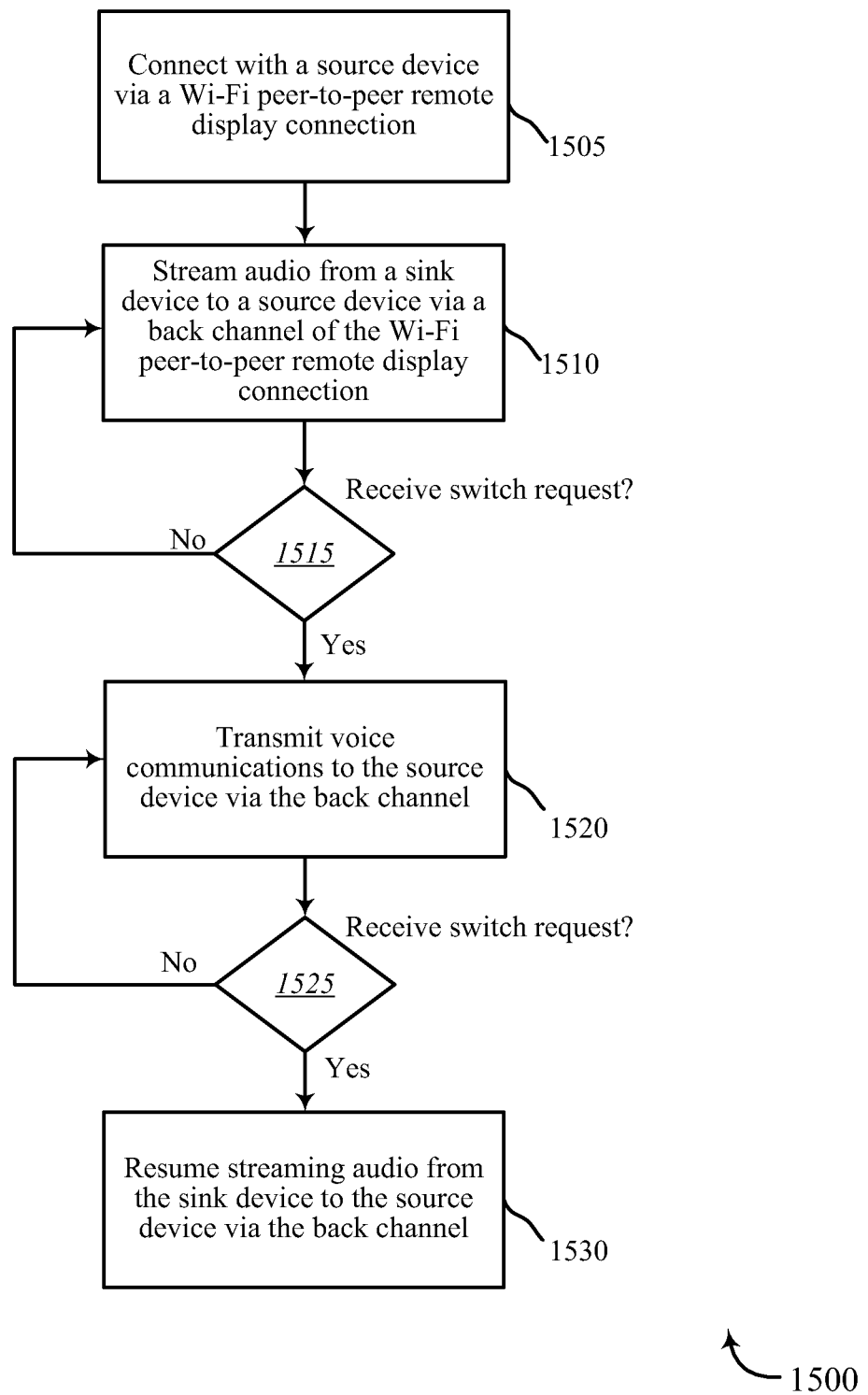
FIG. 15 is a flow chart illustrating an embodiment of a method for controlling a back channel for audio and/or voice communications in a Wi-Fi remote display connection.

FIG. 15 is a flow chart illustrating an embodiment of a method 1500 for controlling a back channel for audio and/or voice communications in a Wi-Fi remote display connection. For clarity, the method 1500 is described below with reference to the wireless communications system 100 shown in FIG. 1, and/or with reference to one of the sink devices 105 described with reference to FIGS. 1, 2, 3, 4, 8, 10, 11, 12, and/or 13. In one implementation, the communications management module 210 described with reference to FIGS. 2, 3, 4, and/or 8 may execute one or more sets of codes to control the functional elements of a sink device 105 to perform the functions described below.

At block 1505, a sink device 105 may establish a Wi-Fi peer-to-peer remote display connection with a source device 115. At block 1510, audio may be streamed from the sink device 105 to the source device 115 via a back channel of the Wi-Fi remote display connection. In one configuration, at block 1515, a decision may be made as to whether a switch request is received. If it is determined, at block 1515, that a switch request has not been received, the sink device 105 may continue to stream audio to the source device 115 via the back channel. If, however, a switch request is received, the audio streaming may be suspended and voice communications may be transmitted to the source device 115 via the back channel. The voice communications may be related to a bi-directional phone call, voice commands for an application on the source device 115, and the like.

At block 1525, a decision may be made as to whether another switch request has been received. For example, a determination may be made as to whether a request has been received to switch the transmissions of the voice communications back to a streaming of audio via the back channel. If it is determined that no additional switch request has been received, the sink device 105 may continue to transmit the voice communications via the back channel. If, however, it is determined that an additional switch request has been received, the sink device, at block 1530, may resume streaming audio to the source device 115 via the back channel.

Therefore, the method 1500 may be used to control a back channel in a Wi-Fi peer-to-peer remote display connection. It should be noted that the method 1500 is just one implementation and that the operations of the method 1500 may be rearranged or otherwise modified such that other implementations are possible.

Figure 16:
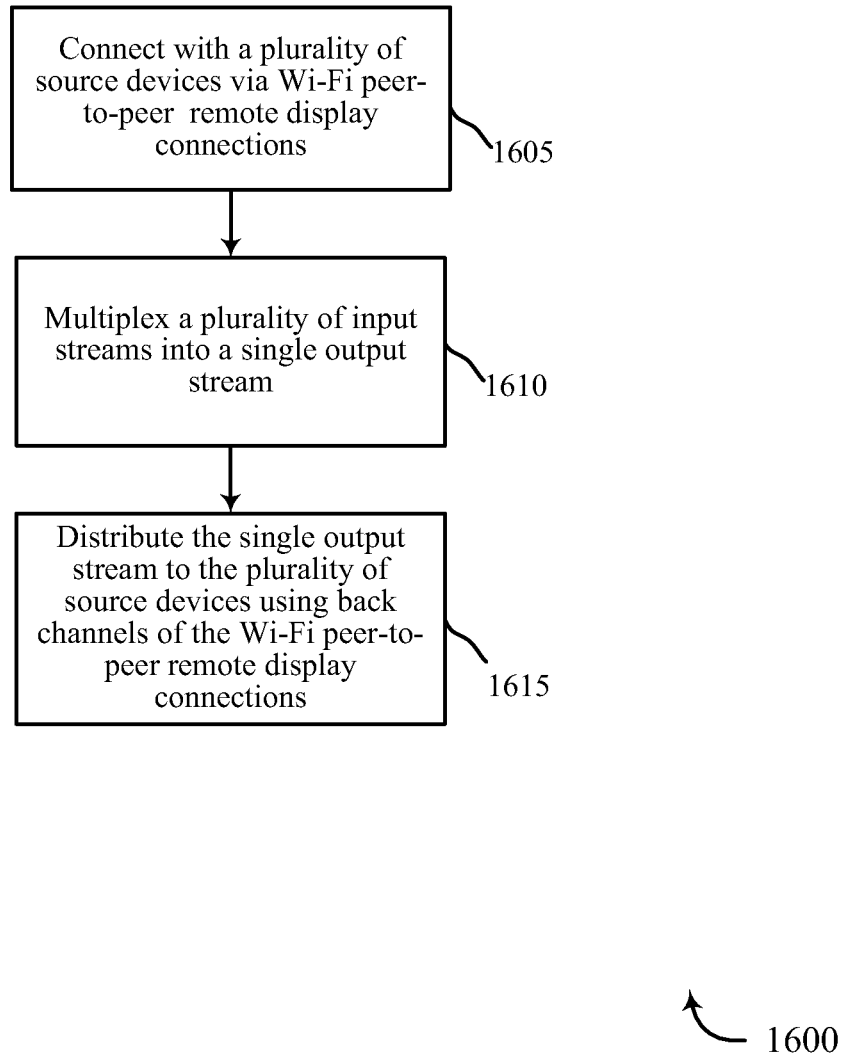
FIG. 16 is a flow chart illustrating an embodiment of a method for communicating multiple input audio/voice streams to a source device using a back channel of a Wi-Fi remote display connection.

FIG. 16 is a flow chart illustrating an embodiment of a method 1600 for communicating multiple input audio/voice streams to a source device 115 using a back channel of a Wi-Fi remote display connection. For clarity, the method 1600 is described below with reference to the wireless communications system 100 shown in FIG. 1, and/or with reference to one of the sink devices 105 described with reference to FIGS. 1, 2, 3, 4, 8, 10, 11, 12, and/or 13. In one implementation, the communications management module 210 described with reference to FIGS. 2, 3, 4, and/or 8 may execute one or more sets of codes to control the functional elements of a sink device 105 to perform the functions described below.

At block 1605, the sink device 105 may connect with a plurality of source devices via Wi-Fi peer-to-peer remote display connections. At block 1610, a plurality of input streams may be multiplexed into a single output stream by using MPEG2-TS format. At block 1615, the single output stream may be distributed to the plurality of source devices using back channels of the Wi-Fi peer-to-peer remote display connections.

Therefore, the method 1600 may be used to transmit multiple input streams to source devices using back channels of Wi-Fi peer-to-peer remote display connections. It should be noted that the method 1600 is just one implementation and that the operations of the method 1600 may be rearranged or otherwise modified such that other implementations are possible.

Figure 17:
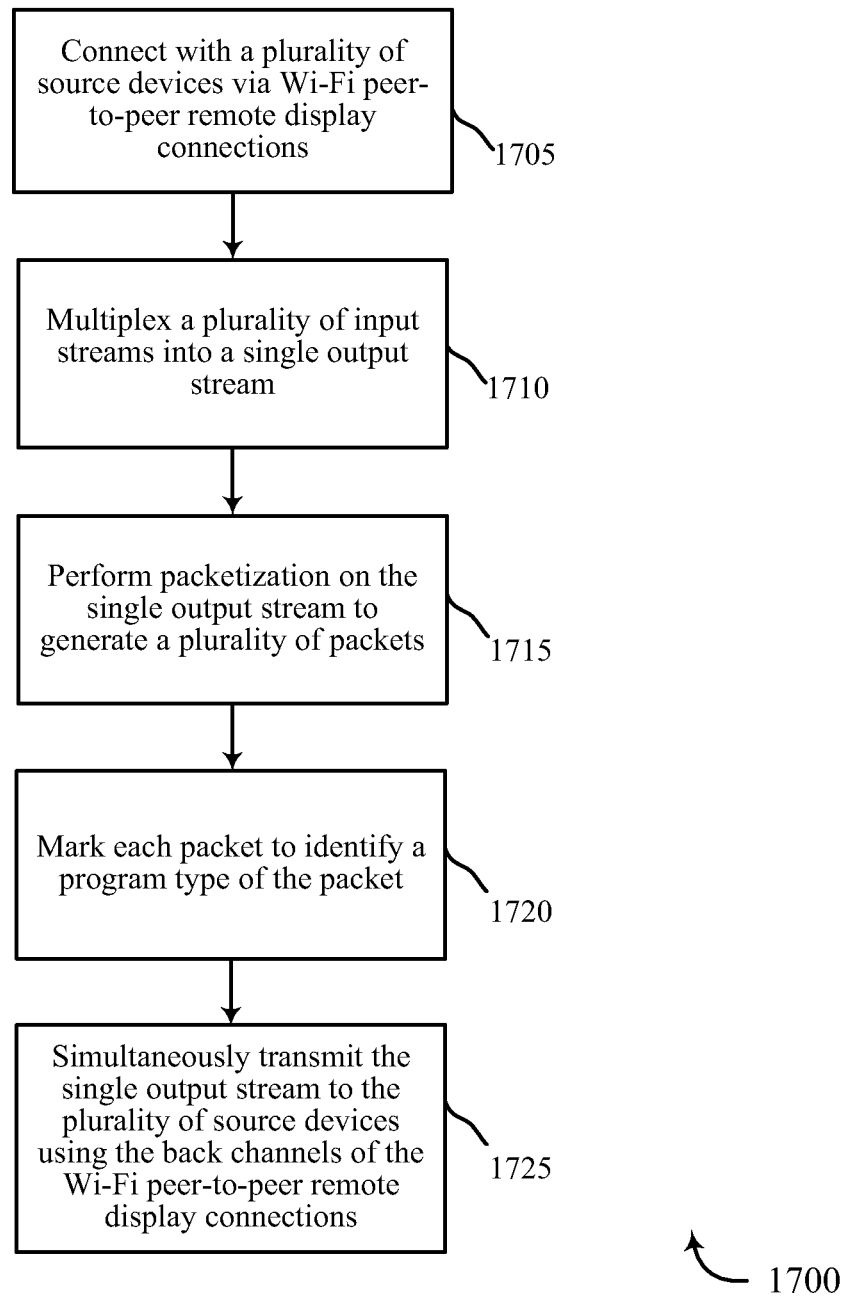
FIG. 17 is a flow chart illustrating an embodiment of a method for communicating multiple input audio/voice streams to a source device using back channels of Wi-Fi remote display connections.

FIG. 17 is a flow chart illustrating an embodiment of a method 1700 for communicating multiple input audio/voice streams to a source device 115 using back channels of Wi-Fi remote display connections. For clarity, the method 1700 is described below with reference to the wireless communications system 100 shown in FIG. 1, and/or with reference to one of the sink devices 105 described with reference to FIGS. 1, 2, 3, 4, 8, 10, 11, 12, and/or 13. In one implementation, the communications management module 210 described with reference to FIGS. 2, 3, 4, and/or 8 may execute one or more sets of codes to control the functional elements of a sink device 105 to perform the functions described below.

At block 1705, a sink device 105 may connect with a plurality of source devices 115. The connections may be Wi-Fi peer-to-peer remote display connections. At block 1710, a plurality of input streams may be multiplexed in to a single output stream. At block 1715, packetization may be performed on the single output stream to generate a plurality of packets. In one configuration, the single output stream may include a first packet for a first source device while the output stream may include a second packet for a second source device. The first packet may include payload of voice communications and the second packet may include the payload from audio streaming content.

At block 1720, each input audio or voice stream packet of the output stream may be marked. The mark may identify a program type of each input stream. In one embodiment, an RTP packet may include both the audio and voice payload each marked with its own program type packet may include audio and voice. In one example, an RTP packet may include video. At block 1725, the single output stream may be simultaneously transmitted to the plurality of source devices using back channels of the Wi-Fi peer-to-peer remote display connections.

Therefore, the method 1700 may be used to transmit multiple input streams to source devices using back channels of Wi-Fi peer-to-peer remote display connections. It should be noted that the method 1700 is just one implementation and that the operations of the method 1700 may be rearranged or otherwise modified such that other implementations are possible.

Figure 18:
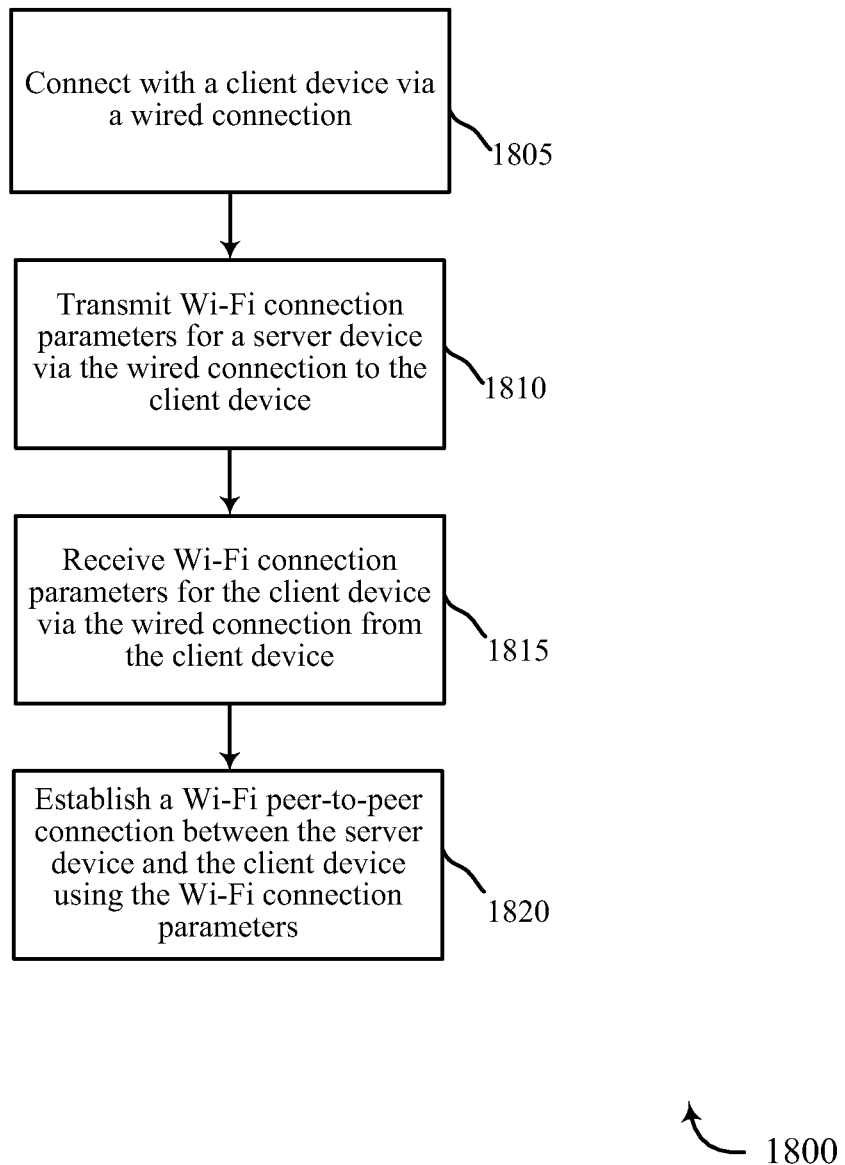
FIG. 18 is a flow chart illustrating an embodiment of a method for using an existing wired connection to establish a Wi-Fi peer-to-peer connection between a server device (e.g., a source device) and a client device (e.g., a sink device).

FIG. 18 is a flow chart illustrating an embodiment of a method 1800 for using an existing wired connection to establish a Wi-Fi peer-to-peer connection between a server device (e.g., a source device 115) and a client device (e.g., a sink device 105). For clarity, the method 1800 is described below with reference to the wireless communications system 100 shown in FIG. 1, and/or with reference to one of the source devices 115 described with reference to FIGS. 1, 5, 6, 7, 9, 10, 11, 12, and/or 13. In one implementation, the connection establishment module 510 described with reference to FIGS. 5, 6, 7, and/or 9 may execute one or more sets of codes to control the functional elements of a source device 115 (i.e., server device) to perform the functions described below.

At block 1805, a connection with a client device may be established via a wired connection (e.g., USB). At block 1810, Wi-Fi connection parameters for the server device (i.e., source device 115) may be transmitted via the wired connection to the client device. At block 1815, Wi-Fi connection parameters for the client device may be received via the wired connection from the client device. At block 1820, a Wi-Fi peer-to-peer connection may be established between the server device and the client device using the Wi-Fi connection parameters.

Therefore, the method 1800 may be used to establish a Wi-Fi peer-to-peer connection between a server and client device using an existing wired connection between the devices. It should be noted that the method 1800 is just one implementation and that the operations of the method 1800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for using a back channel for communicating in a Wi-Fi peer-to-peer remote display connection, comprising:
   connecting with a source device via a Wi-Fi peer-to-peer remote display connection;
   receiving, from the source device, a message requesting an audio type; and
   transmitting streaming audio or voice communications from a sink device to the source device using a back channel of the Wi-Fi peer-to-peer remote display connection.

2. The method of claim 1, further comprising:
   switching the streaming of audio to a transmission of voice communications via the back channel.

3. The method of claim 1, further comprising:
   switching the transmission of the voice communications to a streaming of audio via the back channel.

4. The method of claim 1, wherein the voice communications are part of a bi-directional voice call.

5. The method of claim 1, wherein the message comprises a request for an audio codec and its associated parameters to use to stream audio to the source device via the back channel.

6. The method of claim 1, further comprising:
   receiving a message from the source device to de-activate the transmission of communications via the back channel.

7. The method of claim 6, wherein the transmission of the communications is de-activated based at least in part on an initialization of an application at the source device.

8. The method of claim 6, wherein the transmission of the communications is de-activated based at least in part on user intervention at the source device.

9. The method of claim 6, further comprising:
   receiving a message from the source device to re-activate the transmission of communications via the back channel.

10. The method of claim 1, further comprising:
    identifying one or more settings of a forward channel used to transmit information from the source device; and
    identifying a transport port and audio codecs to use to transmit communications via the back channel, the identification of the transport port and audio codecs based at least in part on the identified settings of the forward channel.

11. The method of claim 1, further comprising:
    receiving Real-Time Transport Protocol (RTP) port profile information from the source device, the profile information identifying whether a User Datagram Protocol (UDP) port or a Transmission Control Protocol (TCP) port has been created for the communication transmissions via the back channel.

12. The method of claim 1, further comprising:
    wherein the message is received within a Real Time Streaming Protocol (RTSP) data structure of a User Input Back Channel (UIBC) capability negotiation message.

13. The method of claim 1, wherein the audio is streamed via the back channel as a MPEG2-Transport Stream (TS).

14. The method of claim 1, further comprising:
    receiving a query from the source device as to whether communication transmissions via the back channel is supported.

15. The method of claim 1, further comprising:
    transmitting a response to a query, the response indicating that communication transmissions via the back channel are supported; and
    transmitting a list of one or more supported audio types and audio codecs.

16. The method of claim 1, further comprising:
    receiving, from the source device, an audio type and audio codec parameters requested by the source device to be used while transmitting via the back channel.

17. An apparatus configured to use a back channel for communications in a Wi-Fi peer-to-peer remote display connection, comprising:
    means for connecting with a source device via a Wi-Fi peer-to-peer remote display connection;
    means for receiving, from the source device, a message requesting an audio type; and
    means for transmitting streaming audio or voice communications from a sink device to the source device using a back channel of the Wi-Fi peer-to-peer remote display connection.

18. The apparatus of claim 17, further comprising:
    means for switching the streaming of audio to a transmission of voice communications via the back channel.

19. The apparatus of claim 17, further comprising:
    means for switching the transmission of the voice communications to a streaming of audio via the back channel.

20. The apparatus of claim 17, wherein the voice communications are part of a bi-directional voice call.

21. The apparatus of claim 17, wherein the message comprises a request for an audio type, an audio codec and its associated parameters to use to stream audio to the source device via the back channel.

22. The apparatus of claim 17, further comprising:
means for receiving a message from the source device to de-activate the transmission of communications via the back channel.

23. The apparatus of claim 22, wherein the transmission of the communications is de-activated based at least in part on an initialization of an application at the source device.

24. The apparatus of claim 22, wherein the transmission of the communications is de-activated based at least in part on user intervention at the source device.

25. The apparatus of claim 22, further comprising:
means for receiving a message from the source device to re-activate the transmission of communications via the back channel.

26. The apparatus of claim 17, further comprising:
means for identifying one or more settings of a forward channel used to transmit information from the source device; and
means for identifying a transport port and audio codecs to use to transmit communications via the back channel, the identification of the transport port and audio codecs based at least in part on the identified settings of the forward channel.

27. The apparatus of claim 17, further comprising:
means for receiving Real-Time Transport Protocol (RTP) port profile information from the source device, the profile information identifying whether a User Datagram Protocol (UDP) port or a Transmission Control Protocol (TCP) port has been created for the communication transmissions via the back channel.

28. The apparatus of claim 17, wherein the message comprises a request for an audio codec to use to stream audio to the source device via the back channel, the message being sent within a Real Time Streaming Protocol (RTSP) data structure of a User Input Back Channel (UIBC) capability negotiation message.

29. The apparatus of claim 17, wherein the audio is streamed via the back channel as a MPEG2-Transport Stream (TS).

30. The apparatus of claim 17, further comprising:
means for receiving a query from the source device as to whether communication transmissions via the back channel are supported.

31. The apparatus of claim 17, further comprising:
means for transmitting a response to a query, the response indicating that communication transmissions via the back channel are supported; and
means for transmitting a list of one or more supported audio types and audio codecs.

32. The apparatus of claim 17, further comprising:
means for receiving, from the source device, an audio type and audio codec parameters requested by the source device to be used while transmitting via the back channel.

33. A sink device configured to use a back channel for communications in a Wi-Fi peer-to-peer remote display connection, comprising:
a processor;
memory in electronic communication with the processor; and
instructions being stored in the memory, the instructions being executable by the processor to:
connect with a source device via a Wi-Fi peer-to-peer remote display connection;
receive, from the source device, a message requesting an audio type; and
transmit streaming audio or voice communications from a sink device to the source device using a back channel of the Wi-Fi peer-to-peer remote display connection.

34. The sink device of claim 33, wherein the instructions are executable by the processor to:
switch the streaming of audio to a transmission of voice communications via the back channel.

35. The sink device of claim 33, wherein the instructions are executable by the processor to:
switch the transmission of the voice communications to a streaming of audio via the back channel.

36. The sink device of claim 33, wherein the voice communications are part of a bi-directional voice call.

37. The sink device of claim 33, wherein the message comprises a request for an audio codec and its associated parameters to use to stream audio to the source device via the back channel.

38. The sink device of claim 33, wherein the instructions are executable by the processor to:
receive a message from the source device to de-activate the transmission of communications via the back channel.

39. The sink device of claim 38, wherein the transmission of the communications is de-activated based at least in part on an initialization of an application at the source device.

40. The sink device of claim 38, wherein the transmission of the communications is de-activated based at least in part on user intervention at the source device.

41. The sink device of claim 38, wherein the instructions are executable by the processor to:
receive a message from the source device to re-activate the transmission of communications via the back channel.

42. The sink device of claim 33, wherein the instructions are executable by the processor to:
identify one or more settings of a forward channel used to transmit information from the source device; and
identify a port and audio codecs to use to transmit communications via the back channel, the identification of the port and audio codecs based at least in part on the identified settings of the forward channel.

43. The sink device of claim 33, wherein the instructions are executable by the processor to:
receive Real-Time Transport Protocol (RTP) port profile information from the source device, the profile information identifying whether a User Datagram Protocol (UDP) port or a Transmission Control Protocol (TCP) port has been created for the communication transmissions via the back channel.

44. The sink device of claim 33, wherein the message comprises a request for an audio codec to use to stream audio to the source device via the back channel, the message being sent within a Real Time Streaming Protocol (RTSP) data structure of a User Input Back Channel (UIBC) capability negotiation message.

45. A computer program product for using a back channel for communicating in a Wi-Fi peer-to-peer remote display connection, the computer program product comprising a non-transitory computer-readable medium storing instructions executable by a processor to:
connect with a source device via a Wi-Fi peer-to-peer remote display connection;

receive, from the source device, a message requesting an audio type; and transmit streaming audio or voice communications from a sink device to the source device using a back channel of the Wi-Fi peer-to-peer remote display connection.

46. The computer program product of claim 45, wherein the instructions are executable by the processor to:

switch the streaming of audio to a transmission of voice communications via the back channel.

47. The computer program product of claim 45, wherein the instructions are executable by the processor to:

switch the transmission of the voice communications to a streaming of audio via the back channel.

48. The computer program product of claim 45, wherein the voice communications are part of a bi-directional voice call.

49. A method for distributing multiplexed input streams, comprising:

connecting with a plurality of source devices via Wi-Fi peer-to-peer remote display connections;

multiplexing a plurality of input streams into a single output stream, the single output stream comprising a first packet for a first source device or a second packet for at least a subset of the plurality of source devices, the first packet comprising voice communications and the second packet comprising an audio streaming content; and distributing the single output stream to the plurality of source devices using back channels of the Wi-Fi peer-to-peer remote display connections.

50. The method of claim 49, wherein distributing the single output stream comprises:

simultaneously transmitting the single output stream to the plurality of source devices using the back channels of the Wi-Fi peer-to-peer remote display connections.

51. The method of claim 49, further comprising:

marking each of a plurality of input audio or voice stream packets of the single output stream, the mark identifying a program type of each input stream.

52. The method of claim 51, wherein a marked packet comprises audio and voice.

53. The method of claim 51, wherein a marked packet comprises video.

54. The method of claim 49, wherein the single output stream is an MPEG2-Transport Stream (TS).

55. An apparatus configured to distribute multiplexed input streams, comprising:

means for connecting with a plurality of source devices via Wi-Fi peer-to-peer remote display connections;

means for multiplexing a plurality of input streams into a single output stream, the single output stream comprising a first packet for a first source device or a second packet for at least a subset of the plurality of source devices, the first packet comprising voice communications and the second packet comprising an audio streaming content; and means for distributing the single output stream to the plurality of source devices using back channels of the Wi-Fi peer-to-peer remote display connections.

56. The apparatus of claim 55, wherein the means for distributing the single output stream comprises:

means for simultaneously transmitting the single output stream to the plurality of source devices using the back channels of the Wi-Fi peer-to-peer remote display connections.

57. The apparatus of claim 55, further comprising:

means for marking each of a plurality of input audio or voice stream packets of the single output stream, the mark identifying a program type of each input stream.

58. The apparatus of claim 57, wherein a marked packet comprises audio and voice.

59. The apparatus of claim 57, wherein a marked packet comprises video.

60. The apparatus of claim 55, wherein the single output stream is an MPEG2-Transport Stream (TS).

61. A sink device configured to distribute multiplexed input streams, comprising:

a processor;

memory in electronic communication with the processor; and instructions being stored in the memory, the instructions being executable by the processor to:

connect with a plurality of source devices via Wi-Fi peer-to-peer remote display connections;

multiplex a plurality of input streams into a single output stream, the single output stream comprising a first packet for a first source device or a second packet for at least a subset of the plurality of source devices, the first packet comprising voice communications and the second packet comprising an audio streaming content; and distribute the single output stream to the plurality of source devices using back channels of the Wi-Fi peer-to-peer remote display connections.

62. The sink device of claim 61, wherein the instructions to distribute the single output stream are executable by the processor to:

simultaneously transmit the single output stream to the plurality of source devices using the back channels of the Wi-Fi peer-to-peer remote display connections.

63. The sink device of claim 61, wherein the instructions are executable by the processor to:

mark each of a plurality of input audio or voice stream packets of the single output stream, the mark identifying a program type of each input stream.

64. The sink device of claim 63, wherein a marked packet comprises audio and voice.

65. The sink device of claim 63, wherein a marked packet comprises video.

66. The sink device of claim 61, wherein the single output stream is an MPEG2-Transport Stream (TS).

67. A computer program product for distributing multiplexed input streams, the computer program product comprising a non-transitory computer-readable medium storing instructions executable by a processor to:

connect with a plurality of source devices via Wi-Fi peer-to-peer remote display connections;

multiplex a plurality of input streams into a single output stream, the single output stream comprising a first packet for a first source device or a second packet for at least a subset of the plurality of source devices, the first packet comprising voice communications and the second packet comprising an audio streaming content; and distribute the single output stream to the plurality of source devices using back channels of the Wi-Fi peer-to-peer remote display connections.

68. A method of establishing a Wi-Fi peer-to-peer connection, comprising:

connecting with a client device via a wired connection;

transmitting, from a server device, Wi-Fi connection parameters for the server device via the wired connection to the client device; and receiving, at the server device, Wi-Fi connection parameters for the client device via the wired connection from the client device, the Wi-Fi connection parameters for the server device and the client device being used to establish the Wi-Fi peer-to-peer connection between the server device and the client device.

69. The method of claim 68, further comprising:
detecting an initialization of an application that uses the Wi-Fi peer-to-peer connection; and
upon detecting the initialization of the application, transmitting the Wi-Fi connection parameters via the wired connection.

70. The method of claim 68, wherein the Wi-Fi connection parameters comprise peer-to-peer capabilities.

71. The method of claim 68, wherein Wi-Fi connection parameters comprise device discovery information.

72. The method of claim 68, wherein the Wi-Fi connection parameters comprise service discovery information, the service comprising a Wi-Fi remote display service or a Wi-Fi peer-to-peer service.

73. An apparatus configured to establish a Wi-Fi peer-to-peer connection, comprising:
means for connecting with a client device via a wired connection;
means for transmitting, from a server device, Wi-Fi connection parameters for the server device via the wired connection to the client device; and
means for receiving, at the server device, Wi-Fi connection parameters for the client device via the wired connection from the client device, the Wi-Fi connection parameters for the server device and the client device being used to establish the Wi-Fi peer-to-peer connection between the server device and the client device.

74. The apparatus of claim 73, further comprising:
means for detecting an initialization of an application that uses the Wi-Fi peer-to-peer connection; and
upon detecting the initialization of the application, means for transmitting the Wi-Fi connection parameters via the wired connection.

75. The apparatus of claim 73, wherein the Wi-Fi connection parameters comprise peer-to-peer capabilities.

76. The apparatus of claim 73, wherein Wi-Fi connection parameters comprise device discovery information.

77. The apparatus of claim 73, wherein the Wi-Fi connection parameters comprise service discovery information, the service comprising a Wi-Fi remote display service or a Wi-Fi peer-to-peer service.

78. A server device configured to establish a Wi-Fi peer-to-peer connection, comprising:
a processor;
memory in electronic communication with the processor; and
instructions being stored in the memory, the instructions being executable by the processor to:
connect with a client device via a wired connection;
transmit, from a server device, Wi-Fi connection parameters for the server device via the wired connection to the client device; and
receive, at the server device, Wi-Fi connection parameters for the client device via the wired connection from the client device, the Wi-Fi connection parameters for the server device and the client device being used to establish the Wi-Fi peer-to-peer connection between the server device and the client device.

79. The server device of claim 78, wherein the instructions are executable by the processor to:
detect an initialization of an application that uses the Wi-Fi peer-to-peer connection; and
upon detecting the initialization of the application, transmit the Wi-Fi connection parameters via the wired connection.

80. The server device of claim 78, wherein the Wi-Fi connection parameters comprise peer-to-peer capabilities.

81. The server device of claim 78, wherein Wi-Fi connection parameters comprise device discovery information.

82. The server device of claim 78, wherein the Wi-Fi connection parameters comprise service discovery information, the service comprising a Wi-Fi remote display service or a Wi-Fi peer-to-peer service.

83. A computer program product for establishing a Wi-Fi peer-to-peer connection, the computer program product comprising a non-transitory computer-readable medium storing instructions executable by a processor to:
connect with a client device via a wired connection;
transmit, from a server device, Wi-Fi connection parameters for the server device via the wired connection to the client device; and
receive, at the server device, Wi-Fi connection parameters for the client device via the wired connection from the client device, the Wi-Fi connection parameters for the server device and the client device being used to establish the Wi-Fi peer-to-peer connection between the server device and the client device.

84. The computer program product of claim 83, wherein the instructions are executable by the processor to:
detect an initialization of an application that uses the Wi-Fi peer-to-peer connection; and
upon detecting the initialization of the application, transmit the Wi-Fi connection parameters via the wired connection.

85. The computer program product of claim 83, wherein the Wi-Fi connection parameters comprise peer-to-peer capabilities.

86. The computer program product of claim 83, wherein Wi-Fi connection parameters comprise device discovery information.

87. The computer program product of claim 83, wherein the Wi-Fi connection parameters comprise service discovery information, the service comprising a Wi-Fi remote display service or a Wi-Fi peer-to-peer service.

* * * * *